(12) United States Patent
Lewis et al.

(10) Patent No.: US 9,883,037 B1
(45) Date of Patent: Jan. 30, 2018

(54) SYSTEMS AND METHODS IN AN ELECTRONIC CONTACT MANAGEMENT SYSTEM TO ESTIMATE REQUIRED STAFF LEVELS FOR MULTI-SKILLED AGENTS

(71) Applicant: ASPECT SOFTWARE, INC., Chelmsford, MA (US)

(72) Inventors: Donald C. Lewis, Bell Buckle, TN (US); Darrell Burkhead, Nashville, TN (US); Diane Wight, Nashville, TN (US); Aaron Beshears, Franklin, TN (US)

(73) Assignee: ASPECT SOFTWARE, INC., Chelmsford, MA (US)

( * ) Notice: Subject to any disclaimer, the term of this patent is extended or adjusted under 35 U.S.C. 154(b) by 0 days.

(21) Appl. No.: 15/617,616

(22) Filed: Jun. 8, 2017

(51) Int. Cl.
*H04M 3/00* (2006.01)
*H04M 5/00* (2006.01)
*H04M 3/51* (2006.01)
*H04M 3/523* (2006.01)
*G06Q 10/06* (2012.01)

(52) U.S. Cl.
CPC .. *H04M 3/5175* (2013.01); *G06Q 10/063118* (2013.01); *H04M 3/5191* (2013.01); *H04M 3/523* (2013.01); *H04M 2203/402* (2013.01); *H04M 2203/558* (2013.01)

(58) Field of Classification Search
CPC ......... H04M 2203/551; H04M 3/5232; H04M 3/5238; H04M 2203/402; H04M 3/2218
USPC ............ 379/265.03, 265.02, 265.01, 266.08, 379/265.11, 265.08, 265.07, 265.06, 379/265.05, 265.14, 266.06
See application file for complete search history.

(56) References Cited

U.S. PATENT DOCUMENTS 7,023,979 B1 * 4/2006 Wu ...................... H04M 3/5233
379/265.11
2006/0182259 A1 * 8/2006 Shaffer ............... H04M 3/5232
379/265.02

* cited by examiner

*Primary Examiner* — Thjuan K Addy
(74) *Attorney, Agent, or Firm* — Husch Blackwell LLP

(57) ABSTRACT

Methods and systems in a contact center for estimating staff levels expected to meet service quality goals are described. In one embodiment, a required staff simulator controller utilizes an event-based simulator to execute staff calculations. The required staff controller reconfigures the simulator for different staff levels and repeatedly runs the simulator to test if the configured staff level is likely or not likely to meet configured service goals using selected confidence levels. The required staff controller determines and presents for each agent type a least upper bound and a greatest lower bound for required staff.

20 Claims, 8 Drawing Sheets

Calculate Required Staff

| General | Contact Types | Agent Types |
| --- | --- | --- |

Contact Types

| Code | Description | Direction | Medium | Dialer Strategy | List Manager | Service Quality Basis |
| --- | --- | --- | --- | --- | --- | --- |
| Collect OV | PowerPoi | Outbound | Voice | Power-mode | Poisson | Average delay |
| SalesIV | InVoice | Inbound | Voice | N/A | N/A | Service level |
| ServiceC | Chat | Inbound | Chat | N/A | N/A | Average customer waiting for reply time |
| ServiceE | EMail | Inbound | E-mail | N/A | N/A | Customer waiting for attention service level |

[ OK ] [ Cancel ] [ Help ]

FIG. 4B

Calculate Required Staff

| General | Contact Types | Agent Types |
|---|---|---|

Contact Types

| Code | Description | Direction | Medium | Dialer Strategy | List Manager | Service Quality Basis |
|---|---|---|---|---|---|---|
| Collect OV | PowerPoi | Outbound | Voice | Power-mode | Poisson | Average delay |
| SalesIV | InVoice | Inbound | Voice | N/A | N/A | Service level |
| ServiceC | Chat | Inbound | Chat | N/A | N/A | Average customer waiting for reply time |
| ServiceE | EMail | Inbound | E-mail | N/A | N/A | Customer waiting for attention service l▼ |

Dropdown options:
- Average delay
- Service Level
- Average customer waiting for attention time
- Customer waiting for attention service level
- Average customer waiting for reply time
- Customer waiting for reply service level

[OK] [Cancel] [Help]

FIG. 4C

Calculate Required Staff

| General | Contact Types | Agent Types |

Agent Types

| Code | Agent Type Description | Enforce Limits Minimum Required Staff | Maximum Required Staff |
|---|---|---|---|
| Collections | Collections | | |
| Sales | Sales | ✓ | |
| Service | Service | | |

[OK] [Cancel] [Help]

FIG. 4D

SYSTEMS AND METHODS IN AN ELECTRONIC CONTACT MANAGEMENT SYSTEM TO ESTIMATE REQUIRED STAFF LEVELS FOR MULTI-SKILLED AGENTS

FIELD

The field relates to a system for determining the number of multi-skilled agents needed to service contacts arriving on diverse media channels in systems such as an automatic contact distribution system.

BACKGROUND

Many modern businesses encourage their customers to communicate with agents of the business through diverse media such as voice calls, text chat, SMS, and email. In many cases, agents are well-trained in diverse, yet specialized, skills that assure high customer satisfaction, once a customer is connected to a suitably skilled agent. In addition to the skills of the agent, a fundamental factor that impacts customer satisfaction is how long a customer must wait before being connected to an agent. Typically, the longer the customer waits the lower is the customer's satisfaction. When agents are engaged in more than one concurrent customer session, as is common for text chat, for example, the customer can also experience extra delays in service within an established customer-agent session while the agent is serving other customers. Traditionally, the agents of the business are organized in contact centers with special facilities for routing different types of customer contacts to appropriately skilled agents that can serve them. Quality of service and service quality are terms used in contact centers to refer to the portion of customer satisfaction that depends on delays in serving waiting customer contacts. Poor service quality is inevitable whenever there are not enough agents to keep pace with the rate customer contacts are offered to the contact center. Larger contact centers use specialized workforce management tools to, among other things, (1) forecast the numbers of different types of customer contacts that are expected to be offered to the contact center in a given period on some future date, (2) generate and maintain agent work schedules for future dates, (3) and model how forecasted contacts will be handled by agents on a future date.

In a modern contact center, where different types of agents have diverse skills and serve diverse types of contacts through different media, the routing of customer contacts to suitable agents is accomplished by a sophisticated automatic contact distribution (ACD) system that is part of a contact routing platform. A fundamental task of such a routing platform is to quickly connect a customer to an appropriately skilled and available agent through some channel of communication. When a contact is offered to the contact center but no suitably skilled agent is available, the routing platform will typically attempt to hold the contact until a suitably skilled, medium enabled agent becomes available, and then make the connection between the contact and the agent. On some platforms, the different types of contacts may be held in first come, first served queues. On other platforms, the contacts may be held in pools where a newly available agent will be routed to a contact whose skill-medium requirements best matches the agent's skills and medium, even though there are other contacts in the pool that have been waiting longer. On still other routing platforms, the possible matches of contacts with available agents may be constrained by complicated dynamic rules that change depending on how long a contact has been waiting in either a queue or pool. Because of the complexity of modern contact routing platforms, some workforce management systems use simulators to model how contacts are routed to agents in a given contact center in order to determine the effect of staff levels of the various types of agents on the performance of the contact center and the quality of customer service.

One fundamental task for a workforce management system is to estimate how many agents of the various skill and media types are required in any period of some future day so that the customers can be expected to receive good quality of service on that future day. Such estimates of required staff levels can then guide the creation of agent work schedules for that future day.

In the case when multiple types of agents serve multiple types of contacts through the medium of text chat, within systems such as an automatic contact distribution system (ACD), determining the staff levels needed to achieve service goals in all periods of the day in a contact center can be a challenging problem. The need to solve this problem has been growing with the increasing popularity of chat messaging as a way for a business to interact with its customers. The problem of estimating staff to service a forecasted number of offered chat sessions is more complicated than that for estimating staff for other media types, such as calls or emails, because agents are typically required to handle more than one chat session at a time. One consequence of this is that the handle-times of individual chat sessions depend on how many concurrent chat sessions the agent is juggling. The expected handle time of a chat session is not a constant during concurrent chat, but depends on the dynamics of agent/customer interactions and how the agent interleaves messages among concurrent contacts. This is a very different situation from handle-times in a call center. Some approaches for calls, for example, assume that each type of call has a fixed average handle-time that is predetermined as a configuration parameter of the call. In concurrent chat, it is necessary to compute the average session handle time based on the (complex) dynamics of how agents interact with concurrent contacts, as well as numerous configuration parameters.

The problem of estimating an average session handle-time is further complicated by the problem of determining the variability in the handle-time of individual chat sessions. Even in the case of non-concurrent chat (only one chat session at a time), the duration of an individual chat session is a random variable that depends, inter alia, on agent message composition times, customer message composition times, agent wrap-up times, and the number of message exchanges that comprise the chat session. All of these quantities are random variables that impact the probability that a fixed number of agents will achieve service goals on any given day, or period of the day.

One approximate solution for concurrent chat was described by Lewis and Beshears in U.S. Pat. No. 8,064,589, filed Jun. 20, 2008, granted Nov. 11, 2011 which is hereby incorporated in its entirety by references. This approach used single-skill chat and was based on an exact solution for the inflation of average session handle-time due to multiple chat sessions in a simplified model where an agent is known to be engaged in a fixed number of chat sessions. A situation where $k$ agents simultaneously serve $\bar{m}$ chat sessions was treated as if there were $k \cdot \bar{m}$ "effective" agents each working a single chat session with the inflated session handle-time that depends on $\bar{m}$. Standard Erlang calculations were used to compute the number of "effective" agents that were required to meet service goals, given the inflated handle time. The number of actual agents was approximated by dividing the number of "effective" agents by m̄.

One approach to estimating staff levels for chat is based on workload computations using the average concurrency of chat sessions during a period. (The concurrency of a chat agent, during a period of some duration, T, can be defined in the following way. Let $D_v$ denote the total duration of time during the period when the agent is simultaneously engaged in exactly v chat sessions, for v=0, 1, 2, 3, . . . . The concurrency of the agent is defined to be $$\frac{1}{T}\sum_v vD_v.)$$

In some cases, an estimate of average concurrency is based on observed historical values, while in other cases ("proactive chat") the chat router attempts to maintain a fixed concurrency that is configured by an administrator. The latter approach is feasible, for example, when the chat system monitors customer browsing behavior on a retail website and can decide to push to a customer a suggestion to chat with an agent based on both that customer's behavior and the actual concurrency of chat agents serving the website. The basic workload formula for concurrent chat (or almost any kind of concurrent work) is given by $$\text{Workload} = \frac{SessionAHT \cdot NumberOfChatSessions}{Concurrency}$$

The Workload is interpreted to be the number of staff-hours that should be scheduled in order to handle the NumberOfChatSessions.

Monte Carlo simulators for the case of just one agent-type and one contact-type communicating through concurrent chat, for a single period of the day, have been used to estimate the staff (the head-count) required to meet service delay goals. These simulators simulated the random arrival of chat sessions and the detailed exchanges of chat messages between individual agents and individual customers. To find the required staff, it was only necessary to adjust the staff level and run new simulations and determine if the adjusted staff was likely to meet service goals. A need exists for systems that create simulations for multiple agent and contact types communicating in diverse media, including chat, and that can estimate required staff for each of the multiple types of agents. Further, there is need for a means to contact other workforce management tools to derive estimates of upper and lower bounds for staffing that is expected to meet quality of service goals on a future day, and to thereby improve workforce management technology by creating detailed simulations of agents and contact behaviors while using the upper and lower bounds for determining the staff required to meet service quality goals.

BRIEF DESCRIPTION OF THE DRAWINGS

FIG. 4A-4D are examples of a Calculator User Interface Display that may be deployed by the Required Staff Calculator 219 according to an example embodiment;

DETAILED DESCRIPTION

Example methods and systems for estimating required staff levels for multiple types of agents handling diverse types of contacts, for example, simultaneous chat sessions or concurrent multimedia sessions are described. In the following description, for purposes of explanation, numerous specific details are set forth in order to provide a thorough understanding of example embodiments. It will be evident, however, to one of ordinary skill in the art that embodiments of the invention may be practiced without these specific details.

Generally, the embodiments disclosed utilize one component of a larger system that contains an event-based Monte Carlo simulator of the dynamics of concurrent chat sessions and other concurrent media-specific sessions between multiple agent types and multiple contact types. This component efficiently marshals simulations to produce estimates of staffing requirements from forecasts of the offered number of contacts of each contact type. The component implements a tunable algorithm that estimates upper and lower bounds for staff levels for each agent type in each period of a day. The expected quality of service resulting from scheduling with the upper bound staff is expected to meet or exceed the configured service goals for every contact type in every period of the day, and the expected quality of service resulting from scheduling with the lower bound staff is expected to fail to meet the configured service goals for every contact type in every period of the day.

The methods and systems for calculating/estimating staff levels expected to meet service quality goals presented are described in the context of using an event-based Monte Carlo simulator of a contact center to describe multiple types of agents, in concurrent sessions, serving multiple types of contacts through different media of communication. These systems and methods for calculating/estimating required staff may also be used in a more general setting. For example, the component that computes required staff bounds has a small list of requirements that can be met by many kinds of simulators, or even other means that can estimate appropriate service qualities given forecasted arrival of types of contacts over possible media and a given staffing.

Figure 1:
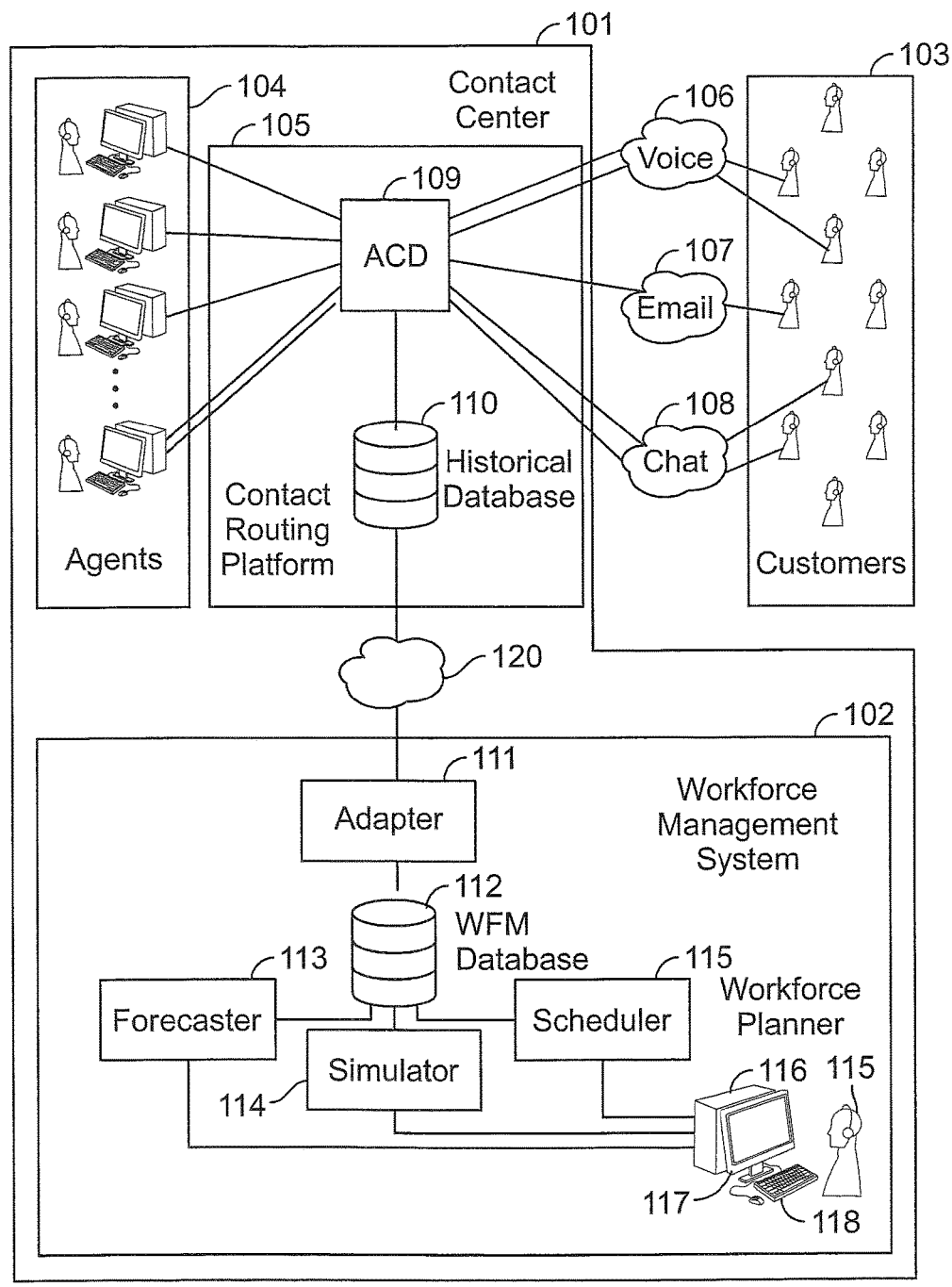
FIG. 1 is a block diagram illustrating an example of a Contact Center 101 including a Contact Routing Platform 105 and Workforce Management System 102.

FIG. 1 is a block diagram illustrating, some components of a workforce management system (WFM) system 102 associated with a contact center 101 with agents 104 serving customers 103 over various media channels such as voice calls 106, text chat 108, or e-mail 107. The contact center 101 has a contact routing platform 105 that includes an automatic contact distributor 109 and an historical database 110. The ACD 109 connects arriving customer contacts to suitable agents in the appropriate medium of communication and maintains records of the dynamics of actual customer and agent interactions in the historical database 110. The workforce management system 102 has an adapter 111 that communicates with the historical database 110 of the contact routing platform 105 over a computer network. The adapter 111 also communicates with a WFM database 112 over a computer network 120 (e.g., the internet). The adapter 111 regularly updates the WFM database 112 with records from the historical database 110 that are pertinent to the management of the agents 104 who work at the contact center 101.

The depicted workforce management system 102 has three components (modules) that are implemented on one or more computers that communicate with the WFM database 112 as shown. A forecasting component 113 uses historical data from the WFM database 112 to produce forecasts of the numbers and kinds of customer contacts that will arrive to the contact center on future dates and how long it will take kinds of agents to serve those contacts. The forecasting component 113 can also store those forecasts for future dates in the WFM database 112 where they can be accessed by other modules of the workforce management system. A scheduling component 115 creates and maintains agent work schedules for future dates. The scheduler 115 stores schedules in the WFM database 112 where they can be accessed by other components of the workforce management system. A Simulator 114 is a simulation component that models the ACD 109 and simulates how long customers wait to be served by agents, which contacts are routed to which agents, and the durations of agent-contact interactions. The simulator can use forecasts produced by the forecaster 113 and schedules produced by the scheduler 115 to simulate the performance of the contact center 101 on a future date. The Simulator's configuration and simulated performance results can be stored in the WFM database 112. A human planner/analyst/administrator (Workforce planner) 115 operates the Forecaster 113, Scheduler 115, and Simulator 114 from a workstation comprising a computer 116, monitor 117, and keyboard and mouse 118. The workstation communicates with the Forecaster 113, Scheduler 115 and Simulator 114 over a computer network. A graphical user interface displayed on the workstation monitor permits the configuration and initiation of forecasting by the Forecaster 113, scheduling by the Scheduler 115, and simulations by the Simulator 114. The results of these operations are displayed in this graphical user interface.

The Workforce Planner 115 uses the forecasting tool to create and maintain forecasts of the numbers and types of customer contacts that are expected to be offered to the contact center 101 on future dates. The Workforce Planner 115 uses the scheduling tool to create and maintain agent work schedules for future dates. The Workforce Planner 115 uses the Simulator 114 to simulate the performance of the Contact Center 101 on future dates given forecasted or hypothetical patterns of contact arrivals and scheduled or hypothetical staff levels on the future date.

One basic workflow for a Workforce Planner 115 is to use the forecasting tool to forecast the numbers and types of contacts that will be offered to a contact center on a future date, use the scheduler 115 to examine agent work schedules for that date to determine the staff that is currently expected to be available on that date, and then configure the simulator 114 for those contacts and staff. The Workforce Planner 115 can then run simulations and view resulting statistics that describe what is expected to happen on that future date. In particular, the results of the simulations might indicate that some types of customers will experience unacceptable delays in service during certain periods of the day. This suggests more staff be scheduled on that date during some periods of the day. The Workforce Planner 115 can repeatedly reconfigure (increase and decrease) staff levels used by the simulator and rerun simulations until a staffing is found that results in acceptable service quality for all types of contacts. This is an error prone, and time consuming process.

Figure 2:
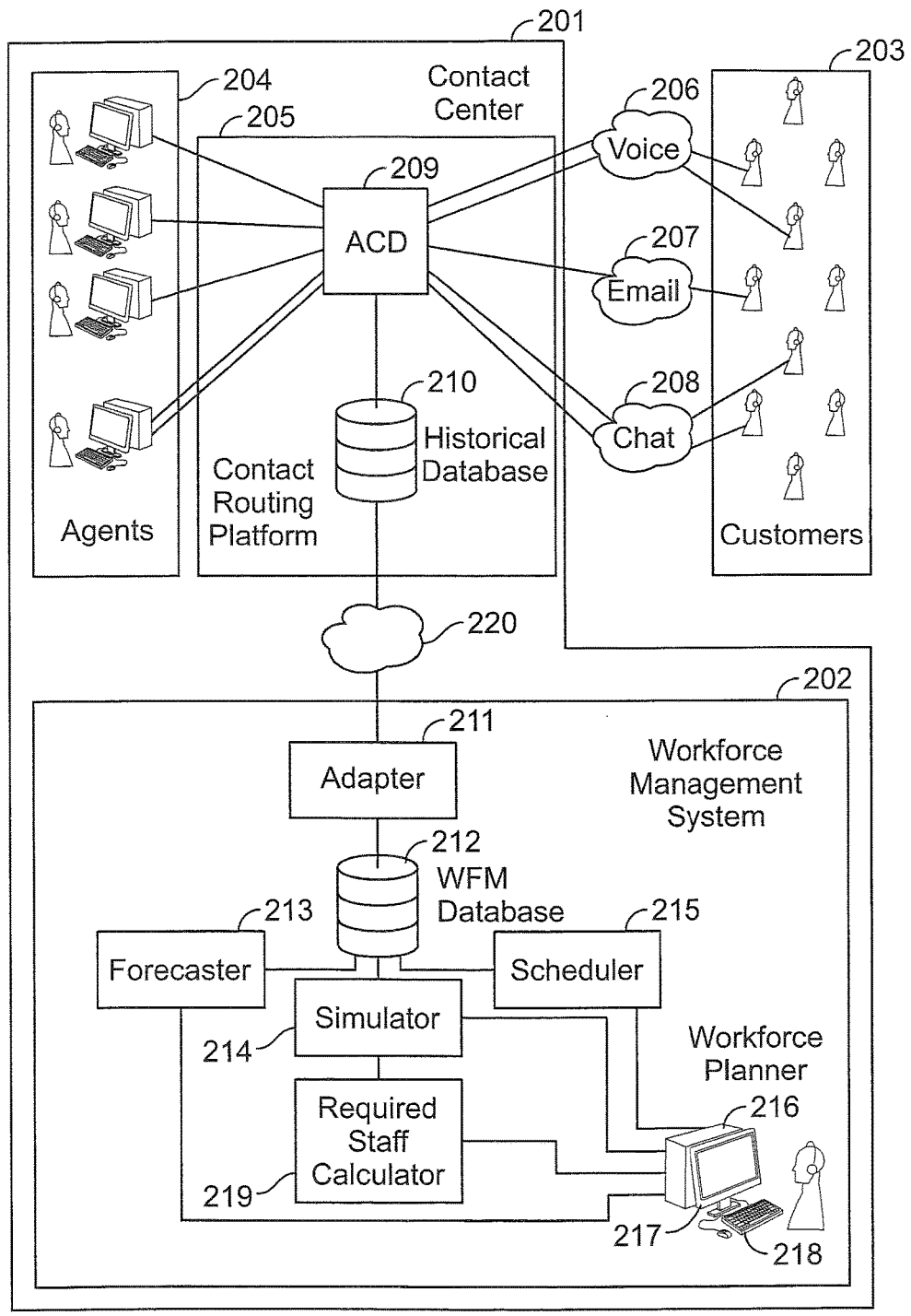
FIG. 2 is a block diagram illustrating an example of Contact Center 201 including a novel Workforce Management System 202 according to an exemplary embodiment of the invention.

An exemplary, Required Staff Calculator/Controller 219 illustrated in the block diagram of FIG. 2 is a device that automates a Contact Center Simulator 214 in order to search for staff levels that result in acceptable delays for all kinds of contacts in all periods of a day. FIG. 2 depicts a Contact Center 201 similar to that of FIG. 1. The difference is that the Workforce Management System 202 of FIG. 2 has an additional component, the Required Staff Calculator/Controller 219. The Required Staff Calculator/Controller 219 (hereinafter Required Staff Calculator) communicates with a Simulator 214 and a workstation's computer 216 over a computer network. The Required Staff Calculator 219 has a graphical user interface that can be displayed on the Monitor 217 and operated with the keyboard and mouse 218.

Because the Required Staff Calculator 219 uses a simulator to estimate the service quality experienced by contacts, there are certain requirements and limitations placed on any the Simulator 214 that are automated by the Required Staff Calculator 219. Thus, the Required Staff Calculator 219 is a device which controls workforce management components to derive estimates of upper and lower bounds for staffing that is expected to meet quality of service goals on a future day.

The simulations generated by the simulator 214 must reflect the non-deterministic nature of the handling of actual contacts by actual agents in an actual contact center being simulated. That is, each run of the simulator 214 results in service quality statistics that are random variables representing service outcomes for a possible day. Multiple runs of the simulator 214 for the same day can be performed and the simulation results include means and standard deviations for all service quality statistics. In particular, when the simulator 214 is configured for some number of runs, the service quality measures returned in each period, for each type of contact, include the average service quality measure (sample mean) over the number of runs and the sample standard deviation of the service quality measure over the number of runs.

Estimates of service quality must show random variability across identically configured runs of the simulator 214. When the simulator 214 performs multiple, identically configured runs, it must report sample means and sample standard deviations for the service quality bases supported by the simulator 214. For any service quality basis, there is a corresponding estimate of the service quality for the tasks remaining in queues or pools at the end of the period. This remaining service quality can be compared to the service quality goal of the next period.

The expected value of any measure of service quality varies monotonically with the number of staff. The Required Staff Calculator 219 may configure the numbers of different types of agents used in simulator runs that estimate service quality. The Required Staff Calculator 219 may configure the number of simulations to run in order to estimate expected service qualities for the configured numbers of different types of agents. The Required Staff Calculator 219 may also configure the start and stop periods that describe the range of periods for which to perform service quality estimates. The Required Staff Calculator 219 may also configure the simulator to enforce or not to enforce minimum and maximum staff limits that are configured in the simulator's user interface by agent-type and period.

The sample means and sample standard deviations obtained from repeated simulator runs may be retrieved by the Required Staff Calculator 219. The simulator 214 has its own user interface that allows a Workforce planner to configure the simulator to actually represent/simulate the behavior of the contact center during some number of consecutive periods, allows the planner to view the results of simulations, and allows the planner to view upper bound and lower bound required staff levels that are the results of a required staff calculation.

In all periods, the simulator 214 can represent any offered contact as being one of a finite number of contact types, can represent any agent as being one of a finite number of agent types, and for any agent type, a maximum and a minimum required staff can be configured for the simulator, which maxima and minima can be retrieved by the Required Staff Calculator 219.

In every period the simulator 214 computes an average total concurrency for each agent-type, which statistic can be retrieved by the Required Staff Calculator 219. Here, in any period, the average total concurrency is the average number of simultaneous sessions an agent of the agent-type engages in a single simulation of the day. The average average total concurrency is the average over multiple simulator runs of the average total concurrency of each run.

While the Contact Center System 101 in FIG. 1 is shown in most instances to include single device components, multiple devices may be used. When multiple devices are present, the multiple devices may be of the same device type or may be a different device type. Similarly, systems 101, 201, 102, 202, 105, 205 may be single sites, multiple sites or distributed. Moreover, the systems 101, 201 show a single network 120, 220 however, the network 120, 220 may be composed of multiple networks. The multiple networks may communicate in series with each other or in parallel to link the devices and systems.

Figure 3:
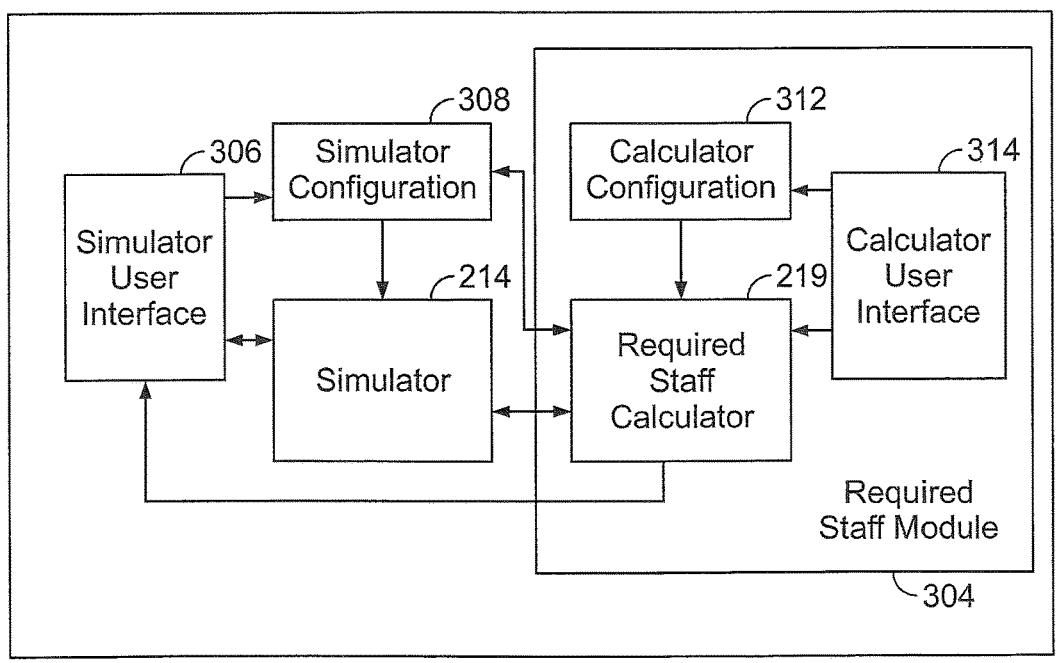
FIG. 3 is a block diagram of an example Required Staff Calculator 219 that may be deployed within the system of FIG. 2, according to an example embodiment.
Figure 4A:
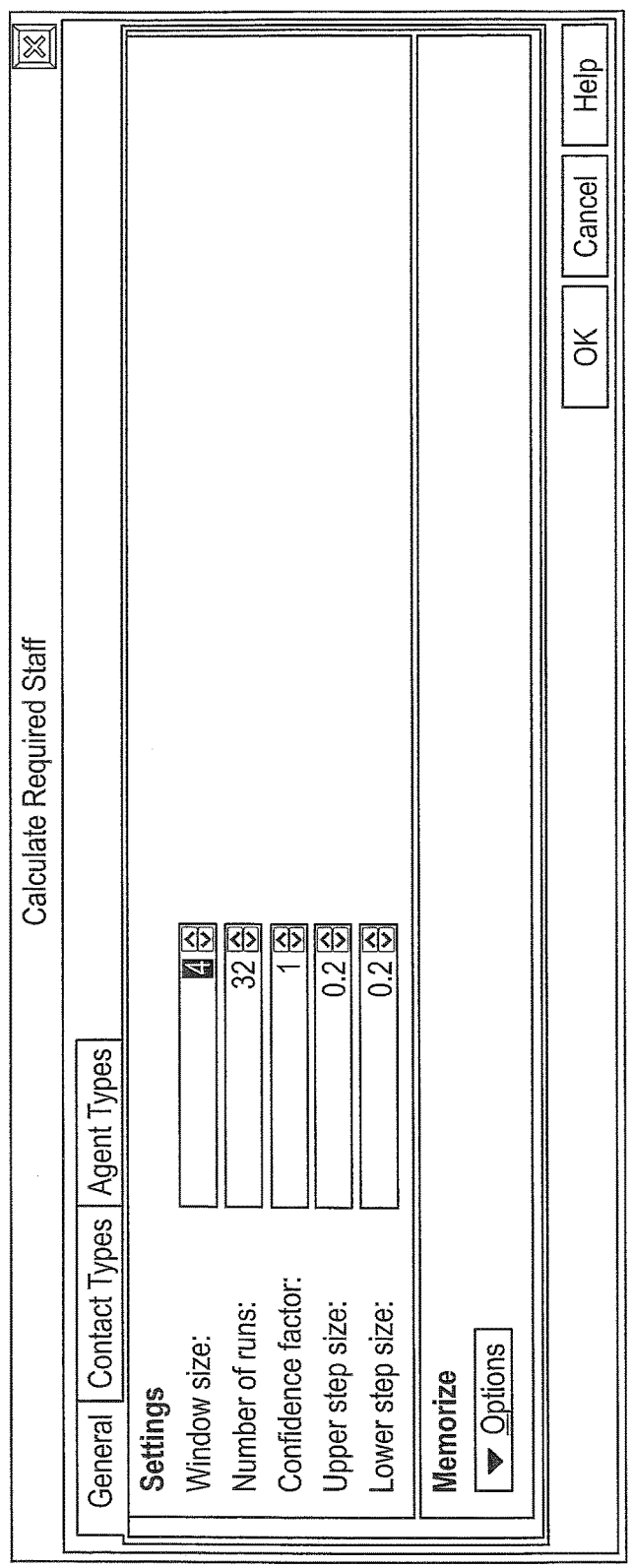

FIG. 3 illustrates an example embodiment of the Required Staff Calculator 219 coupled to the Simulator 214 of FIG. 2. The Required Staff Calculator 219 may include subsystems, as shown, such as a Calculator Configuration Module 312 coupled to a Calculator User Interface 314, as shown in FIG. 3. The Simulator 214 in the illustrated embodiment is coupled to a Simulator User Interface 306 and a Simulator Configuration Module 308 which are each coupled to the Required Staff Calculator 219.

In one embodiment, the Simulator 214 utilizes a Monte Carlo, event-based simulator of multi-skilled concurrent contacts. The simulator 214 couples to the user interface 306 that is used to configure and run simulations as well as display numerous statistics about the outcomes of simulations, for example, by periods of the day, that describe one day of contacts. The Required Staff Module 304 uses the Required Staff Calculator 219, and User Interface 314 for configuring and executing a staff calculation. During a staff calculation, the Required Staff Calculator 219 takes control of the Simulator 214. It reconfigures the Simulator 214 for different staff levels and repeatedly runs the simulator to test if the configured staff is likely to meet configured service goals. At the end of a required staff calculation, the Required Staff Calculator 219 updates the Simulator User Interface 306 with staffing results, presenting, for each type of agent and each period of the day, both an upper bound for the required staff and a lower bound for the required staff.

The Required Staff Calculator 219 calculates upper bounds and lower bounds for the numbers of different types of agents that will be required to meet specified quality of service goals. In any period, these staff bounds are restricted to be non-negative integer values representing the number of staff of each agent type. A required staff upper bound is a staffing that the Required Staff Calculator 219 is "confident" will meet all specified service quality goals, in any period. A required staff lower bound is a staffing the Required Staff Calculator 219 is "confident" will miss all specified service quality goals in every period, whenever contacts are available. A required staff least upper bound in a period is a staffing this is an upper bound for the required staff in the period such that decreasing the number of staff in a least upper bound by one agent produces a staffing that is not an upper bound staffing. A required staff greatest lower bound in a period is a staffing that is a lower bound for the required staff such that increasing the number staff in the greatest lower bound by one agent produces a staffing that is not a lower bound staffing.

A required staff calculation completes when any one of three conditions are met. (1) The Required Staff Calculator 219 has found a least upper bound and a greatest lower bound for the required staff, in every period. (2) The Required Staff Calculator 219 has determined that no upper bound exists that can meet all specified quality of service goals. (3) Any upper bound exceeds an enforced limit on the maximum required staff for one or more staff groups.

The required staff calculation is based on (typically 15 minute or 30 minute) consecutive periods that comprise a nominal "day" at a contact center. Starting with the first period of the day and ending with the last period of the day, it calculates a required staff least upper bound and a required staff greatest lower bound one period at a time.

In any period, the required staff calculation has two main phases. In the first phase, the Required Staff Calculator 219 attempts to find an initial upper bound staffing and an initial lower bound staffing. If the first phase is a success, then the Required Staff Calculator enters the second phase. Otherwise, the Required Staff Calculator 219 reports through its user interface that not all service goals can be met and the calculation terminates. During the second phase, the Required Staff Calculator 219 repeatedly attempts to decrease the staff in the current upper bound staffing to find a new upper bound staffing that still meets all service goals but has less staff and the Required Staff Calculator 219 repeatedly attempts to increase the staff in the current lower bound staffing to find a new lower bound that still misses all goals but has greater staff The second phase terminates when the calculator has found a required staff least upper bound and a required staff greatest lower bound.

When a required staff least upper bound and a required staff greatest lower bound have been found for the last period of the day, the Required Staff Calculator 219 updates the Required Staff Upper Bound and the Required Staff Lower Bound statistics for each period in the Simulator's user interface.

There are a plurality of natural ways to measure and summarize the delays in service a customer contact experiences in a contact center, some measures being more or less appropriate, depending on the medium of communication between the customer and agent. Here, each different measure of delay provides a basis for measuring the quality of service the contact center provides different types of contacts in any period. The Required staff calculator supports 6 distinct measures of delay, or service quality bases: Average Delay, Service Level Percent, Average Customer Waiting for Attention Time, Customer Waiting for Attention Service Level Percent, Average Customer Waiting for Reply Time, and Customer Waiting for Reply Service Level Percent. For each contact type, the Workforce planner configures service quality goals in the simulator for each of these service quality bases in every period of the simulated day. When simulations are run, the Simulator computes the expected quality of service for each type of contact. Both the configured goals and the simulated service quality results are available to the Required Staff Calculator. The Required Staff Calculator compares the goals and the results of simulations to guide its search for the numbers of different agent types required to meet configured goals.

Average Delay is the average amount of time (in seconds) that contacts are held in a queue or pool waiting to be connected to an agent. An average delay is computed for each type of contact and each period of the day. The configured Average Delay Goal is some number of seconds. The goal is met if the Average Delay is less than or equal to the Average Delay Goal.

Service Level Percent is the percent of contacts that spend less than a specified number of seconds in a queue or pool waiting to be connected to an agent. A service level percent is computed for each type of contact and each period of the day. The configured Service Level Percent Goal is a number between 0 and 1, expressed as a percent. The specified number of seconds is configured for each contact-type in each period as the Service Level Percent Goal Seconds. The goal is met if the Service Level Percent is greater than or equal to the Service Level Percent Goal.

In messaging media like text chat, a session comprises a number of messages composed by the customer and a number of "reply" messages composed by the agent. At the point the customer completes and sends a message, the agent may be serving another customer. As a result, the first customer can experience a delay before the agent's attention turns to the first customer and starts working on a reply. In this type of delay in service, the customer is waiting to get the attention of the agent. Each time the customer sends a message to the agent can be thought of as an attempt to get the agent's attention. Similarly, each time a customer sends a message to the agent there is the delay the customer experiences before the agent actually sends a reply. This delay includes the wait for attention and the time it takes the agent to compose the reply. Each time an agent replies there is a wait for the reply experience by the customer. So when agents are capable of concurrently engaging in several sessions there are other significant measures of service quality.

Average Customer Waiting for Attention Time is the sum of the durations (in seconds) that customers waited for agents' attention divided by the number of times customers attempted to get the attention of an agent. This average is computed for every type of contact in every period. This statistic is pertinent when agents are engaged in more than one concurrent session. It is a delay in service to customers due to the fact that agents are simultaneously serving other customers. The configured Average Customer Waiting for Attention Time Goal is some number of seconds. The goal is met if the Average Customer Waiting for Attention Time is less than or equal to the Average Customer Waiting for Attention Time Goal.

Customer Waiting for Attention Service Level Percent is the percentage of times customers attempted to get agents' attention where the agents focused attention on the customers within a specified number of seconds. This statistic is computed for each type of contact and each period of the day. This statistic is pertinent when agents may be engaged in more than one concurrent session. It is a delay in service to customers due to the fact that agents may be simultaneously serving other customers. The configured Customer Waiting for Attention Service Level Percent Goal is a number between 0 and 1, expressed as a percent. The specified number of seconds is configured for each contact-type in each period as the Customer Waiting for Attention Service Level Percent Goal Seconds. The goal is met if the Customer Waiting for Attention Service Level Percent is greater or equal to the Customer Waiting for Attention Service Level Percent Goal.

Average Customer Waiting for Reply Time is the sum of the durations (in seconds) that customers waited for agents' replies divided by the number of replies. This average is computed for every type of contact in every period of the day. The configured Average Customer Waiting for Reply Time Goal is some number of seconds. The goal is met if the Average Customer Waiting for Reply Time is less than or equal to the Average Customer Waiting for Reply Time Goal.

Customer Waiting for Reply Service Level Percent is the percentage of times agents replied to customers where the agents sent the reply to the customer within a specified number of seconds. This statistic is computed for each type of contact and each period. The configured Customer Waiting for Reply Service Level Percent Goal is a number between 0 and 1, expressed as a percent. The specified number of seconds is configured for each contact type in each period as the Customer Waiting for Attention Service Level Percent Goal Seconds. The goal is met if the Customer Waiting for Reply Service Level Percent is greater than or equal to the Customer Waiting for Reply Service Level Percent Goal.

A service quality goal is infeasible when it is not possible to meet the goal no matter how many agents are staffed. For example, it is possible to configure infeasible goals for Average Customer Waiting for Reply Time and Customer Waiting for Reply Service Level Percent. The reason is that those two quality of service measures include the time it takes the agent to complete a reply to a customer. That is, it includes the time while the agent is actually serving the customer. If it actually takes agents 10 minutes, on average, to serve each customer and the Average Customer Waiting for Reply Time goal is 1 minute, then simply increasing the number agents will not achieve the goal.

The Required staff calculator is able to detect such infeasible goals by examining the total concurrency of the different types of agent. For any type of agent, in any period, the total concurrency is the average number of sessions an agent is handling at any time. The simulator provides an estimate of the average total concurrency of agents of each agent type which is available to the Required staff calculator When the average total concurrency is very small, say less than 0.01 for all agent types, then more than 99% of the time any agent is idle and is serving no customer. In this case, if some quality of service goal is not met, then this goal is considered infeasible and the Required staff calculator reports the problem to the user and cancels the calculation.

Another way to encounter infeasible goals is when a Maximum Required Staff is enforced by the Required staff calculator. For example, a Workforce planner may configure the simulator with upper limits on the numbers of different kinds of agents that are available in each period of the day. The required staff calculator can enforce those limits during its search for required staff, and determine that the quality of service goals cannot be met with the limited staff. In this case, the goals are infeasible due to the enforced limits on the required staff.

An example of a Calculator User Interface display that may be used to configure the parameters used in the search for an upper bound and a lower bound for the required staff is shown in FIGS. 4A, 4B, 4C, and 4D. That same interface display also can be used to launch an actual calculation of required staff. The following describes that interface display and the configuration parameters.

The Required staff calculator user interface 314 is used by a Workforce planner to configure parameters that control the search for an upper bound and a lower bound for the required staff. This user interface also allows the Workforce planner to initiate a required staff calculation. The user interface has three tabs to help organize the configuration. The General tab shown in FIG. 4A has 5 numerical parameters that impact the search for the upper and lower bounds. By adjusting these parameters, the user is able to make tradeoffs between the quality of the search result, and how long it takes to perform the calculation. The Contact Types tab, see FIG. 4B displays a grid. Each row of the grid identifies and describes a unique contact type. There is one row for every contact type configured in the simulator. The last column in the grid displays the service quality basis that will be used, during the required staff calculation, to measure the quality of service for the contact type of that row. By clicking on a cell in the Service Quality Basis column, (FIG. 4C) the user may choose any one of the service quality bases from a list. The Agent Types tab (FIG. 4D) displays a grid. Each row in the grid identifies and describes a unique agent type. There is one row for every agent type configured in the simulator. The last two columns provide check boxes that indicate whether or not the required staff calculation should enforce absolute limits on the number of agents of the given agent type. For each period of the day, for each agent type, a minimum number of agents and a maximum number of agents are configured in the Simulator user interface. When Minimum Required Staff is checked, the Lower Bound staff returned by a required staff calculation will be greater than or equal to the configured Minimum in each period. When Maximum Required Staff is checked, any Upper Bound staff successfully returned by a required staff calculation will be less than or equal to the configured Maximum. By clicking on any one of the Minimum Required Staff or Maximum Required Staff cells, the user can toggle the check mark and toggle whether or not minimums or maximums will be enforced. Once the Workforce planner has configured the Required staff calculator, the planner clicks the OK button to initiate the required staff calculation or clicks the Cancel button to cancel the required staff calculation. By clicking the Help button, the planner can view help topics covering how to use the Required staff calculator. After a successful calculation of required staff, the Required staff calculator updates the Simulator's user interface with the required staff least upper bound and the required staff greatest lower bound.

Window size. A Workforce planner can configure the Window size to be any integer from 1 to the number of periods in the simulation. The number of periods in the simulation is configured in the Simulator user interface. When the Window size parameter is set to some value, w, then when the Required staff calculator is estimating service quality in some given period, it will configure the simulator to simulate over at most w−1 previous periods. It is necessary to allow w to be larger than 1 because session handle times can be longer than the period length and because one cannot assume the contact center is in a steady-state.

Number of runs. A Workforce planner can configure the Number of runs to be any integer greater than 1 The Required staff calculator tests hypothetical staff levels to see if they meet configured service quality goals using the service quality bases configured under the Contact Types tab. Due to the random variability in contact arrivals, routing of contact types among agent types, talk times, chat message composition times, the number of message exchanges in a chat session, session wrap-up time, etc., the measure of service quality achieved by some staffing is also a random variable. The Number of runs parameter sets the number of simulation runs the Required staff calculator will use to estimate the expected value of the service quality measures and the standard deviations of those service quality measure for the various contact types in any period.

Confidence factor. A Workforce planner can configure the Confidence factor to be a non-negative real number. When the Required Staff Calculator tests a hypothetical staff level using multiple runs to judge if the staff meets service quality goals, it uses the configured Confidence factor to impose a degree of confidence in any conclusion about whether the particular staffing can be expected to be either an upper bound or a lower bound for the required staff.

As an example, suppose the service quality basis is Service Level Percent and the number of runs is n, and for a given period and type of contact, the sample mean over the n runs of the simulated Service Level Percent statistic is $\bar{x}$, the sample standard deviation of the Service Level Percent statistic over those n runs is s, and the service level goal percent is g. Let c be the Confidence factor.

The Required Staff Calculator will "confidently" conclude there is over-staffing if $$\bar{x} \geq \min\left\{g + c\frac{s}{\sqrt{n}}, 100\right\},$$

so that the mean Service Level Percent of the n runs is the least of either c standard errors greater than the goal or 100, The Required Staff Calculator will "confidently" conclude there is under-staffing if $$\bar{x} \leq \max\left\{0, g - c\frac{s}{\sqrt{n}}\right\},$$

so that the mean Service Level Percent of the n runs is greatest of either c standard errors less than the goal or 0.

When the Service quality basis is Service Level Percent for all contact types, the Required Staff Calculator can apply an "Upper Bound Confidence Test" and a "Lower Bound Confidence Test" to a partial staffing. Let $$Z^\tau(t) = \begin{pmatrix} Z_1^\tau(t) \\ Z_2^\tau(t) \\ \vdots \\ Z_m^\tau(t) \end{pmatrix}$$

be a staffing for the m types of agents, $i \in \{1, 2, \ldots, m\}$, in the simulation for periods, $t \in \{1, 2, \ldots, \tau\}$, where $\tau$ is an integer greater than 0 and less than or equal to the number of periods in the day. Such a staffing can be called a partial staffing because it only describes the staff in the first $\tau$ periods of the day. Let $q = \min\{\tau, w\}$, where w is the configured Window size. To perform a Confidence Test on a partial staffing, the Required Staff Calculator may configure the simulator with the staff, $Z^\tau$. It then has the simulator execute n runs (where n is the configured Number of runs) over the range of periods, $t \Sigma \{\tau-q+1, \tau-q+2, \ldots, \tau-1, \tau\}$. When these simulations complete, the Required Staff Calculator examines the values of the simulator's result statistics $\bar{x}_j(t)$ and $s_j(t)$ for each of the k types of contacts, $j \in \{1, 2, \ldots, k\}$, in the simulations, and for periods $t \Sigma \{\tau-q+1, \tau-q+2, \ldots, \tau-1, \tau\}$. If for all $$\bar{x}_j(t) \geq \min\left\{g_j(t) + c\frac{s_j(t)}{\sqrt{n}}, 100\right\}$$

$j \in \{1, 2, \ldots, k\}$ and all $t \in \{\tau-q+1, \tau-q+2, \ldots, \tau-1, \tau\}$, then $Z^\tau(\tau)$ passes the Upper Bound Confidence Test.

If $$\bar{x}_j(t) \leq \max\left\{0, g_j(t) - c\frac{s_j}{\sqrt{n}}\right\}$$

for all $j \in \{1, 2, \ldots, k\}$ and all $t \in \{\tau-q+1, \tau-q+2, \ldots, \tau-1, \tau\}$, then $Z^\tau(\tau)$ passes the Lower Bound Confidence Test.

The Required staff calculator may use these same upper and lower confidence tests when the service quality basis for the contact types is Customer Waiting for Attention Service Level Percent or Customer Waiting for Reply Service Level Percent. The confidence tests must be modified when the service quality basis is Average Delay.

Assuming the service quality basis is Average Delay and the Number of runs is n. Suppose, for a given period and forecast group, the sample mean over the n runs of the Average Delay statistic is $\bar{x}$, the sample standard deviation of the Average Delay statistic over those n runs is s, and the service level goal in seconds is g. Let c be the Confidence factor. The Required Staff Calculator can "confidently" conclude there is over-staffing if $$\bar{x} \leq \max\left\{0, g - c\frac{s}{\sqrt{n}}\right\},$$

so that the mean Average Delay of the n runs is the greatest of either c standard errors less than the goal or 0. The Required Staff Calculator will "confidently" conclude there is under-staffing if $$\bar{x} \geq g + c\frac{s}{\sqrt{n}},$$

so that the mean Average Delay of the n runs is c standard errors greater than the goal.

When the Service quality basis is Average Delay, the Required Staff Calculator can apply an "Upper Bound Confidence Test" and a "Lower Bound Confidence Test" to a partial staffing. Let $$Z^\tau(t) = \begin{pmatrix} Z_1^\tau(t) \\ Z_2^\tau(t) \\ \vdots \\ Z_m^\tau(t) \end{pmatrix}$$

be a staffing for the m types of agents, $i \in \{1, 2, \ldots, m\}$, configured in the Simulator for periods, $t \in \{1, 2, \ldots, \tau\}$, where $\tau$ is an integer greater than 0 and less than or equal to the number of periods in the day. Such a staffing is a partial staffing because it only describes the staff in the first $\tau$ periods of the day. Let $q = \min\{\tau, w\}$, where w is the configured Window size. The Required Staff Calculator configures the simulator with the staff, $Z^\tau$. It then has the simulator execute n runs (where n is the configured Number of runs) over the range of periods, $t \in \{\tau-q+1, \tau-q+2, \ldots, \tau-1, \tau\}$. When these simulations complete, the Required Staff calculator examines the values of the simulator's result statistics $\bar{x}_j(t)$ and $s_j(t)$ for each of the k types of contacts, $j \in \{1, 2, \ldots, k\}$, in the simulations, and for periods $t \in \{\tau-q+1, \tau-q+2, \ldots, \tau-1, \tau\}$. If $$\bar{x}_j(t) \leq \max\left\{0, g_j(t) - c\frac{s_j(t)}{\sqrt{n}}\right\}$$

for all $j \in \{1, 2, \ldots, k\}$ and all $t \in \{\tau-q+1, \tau-q+2, \ldots, \tau-1, \tau\}$, then $Z^\tau(\tau)$ passes the Upper Bound Confidence Test.

If $$\bar{x}_j(t) \geq g_j(t) + c\frac{s_j(t)}{\sqrt{n}}$$

for all $j \in \{1, 2, \ldots, k\}$ and all $t \in \{\tau-q+1, \tau-q+2, \ldots, \tau-1, \tau\}$, then $Z^\tau(\tau)$ passes the Lower Bound Confidence Test.

The Required staff calculator uses these same upper and lower confidence tests when the service quality basis for the contact types is Average Customer Waiting for Attention Time or Average Customer Waiting for Reply Time.

For any service quality basis, the Required staff calculator may use enhanced upper and lower confidence tests in any period. The enhanced tests also compare delays remaining at the end of any period to the service goals in the next period in order to be confident that goals in the next period can be achieved for the contacts waiting for service at the start of the next period.

The Workforce planner can configure the Upper step size and the Lower step size to be real numbers that are greater than 0 and less than 1. After the Required Staff Calculator finds initial Upper and Lower bounds for required staff, it iteratively seeks to reduce the gap between the two bounds by finding still greater Lower bounds it is "confident" under-staff the period (i.e. will miss all service quality goals) and finding still lesser upper bounds it is "confident" over-staff the period.

The required staff calculator uses the configured upper step size to create new candidate upper bound staff levels for an agent type in a period from the current upper bound staffing. Let U denote the current upper bound, L denote the current lower bound, uss denote the configured upper step size, usf denote a non-negative integral power of uss, and U' denote a new candidate upper bound. When U−L>1 and usf is small enough, a new candidate upper bound is computed using the rule $$U' = \begin{cases} U - \text{Round}((U-L) \cdot usf) & \text{if } (U - \text{Round}((U-L) \cdot usf)) > L \\ U - 1 & \text{if } (U - \text{Round}((U-L) \cdot usf)) \leq L \end{cases}$$

As with Upper step size, the calculator uses the configured Lower step size to create new candidate lower bound staff levels for an agent type in a period from the current lower and upper bound. For example, let lss denote the configured lower step size, lsf denote a non-negative power of lss, and L' denote a new candidate lower bound. When U−L>1 and lss is small enough a new candidate lower bound is computed using the rule $$L' = \begin{cases} L + \text{Round}((U-L) \cdot lsf) & \text{if } (L + \text{Round}((U-L) \cdot lsf)) < U \\ L + 1 & \text{if } (L + \text{Round}((U-L) \cdot lsf)) \geq U \end{cases}$$

By this rule, the new candidate lower bound is between the current upper bound and current lower bound. As will be described later, in the Details section, the actual computations are more complicated than this generic case, when U−L is small enough.

A Memorize Options button is a convenience for the Workforce planner. Once the Required staff calculator has been configured, the planner can click the Memorize Options button, give the configuration a name and save it. Once one or more configurations have been saved, clicking the Memorize Options provides a way to restore any of the saved configurations.

The Workforce planner views the Contact Types tab (see FIG. 4B) to see a list of all the different types of contacts configured in the Simulator for the date that is being simulated. Each different contact type has a unique Code, a text Description, and information about the Direction and Medium of the contact type. In the case of Outbound Voice, the Dialer Strategy and the kind List Manager that will be simulated are also displayed. (Note, any number of contact types in the list may have identical Direction, Medium, Dialer Strategy, and List Manager, although that situation is not illustrated in FIG. 4A.) These properties are all obtained from the configuration of the Simulator and cannot be modified in the Required staff calculator user interface. They are displayed for the convenience of the Workforce planner. The purpose of the Contact Types tab is to allow the Workforce planner to independently configure a service quality basis for each type of contact. These are the service quality bases that will be used in the required staff calculation.

Informed by the Code, Description, Direction, Medium, and any Dialer Strategy or List Manager of a contact type, the Workforce planner selects any one of the service quality bases to be used for that type of contact during the required staff calculation. This is accomplished by clicking on the cell in the Service Quality Basis column that is in the row of the contact type, and selecting a service quality basis from a drop-down list, as shown in FIG. 4C The actual calculation of the required staff depends only on the association of the unique Code of each contact type with its service quality basis. The Required staff calculator knowns nothing about different media, directions, dialer strategies, or list managers. The Workforce planner selects a particular service quality basis because of business goals or the desire to see the impact of using different measures of service quality.

The Workforce planner views the Agent Types tab (see FIG. 4D) to see a list of all the different types of agents configured in the Simulator for the date that is being simulated. Each different agent type has a unique Code and a text Description. Here the Workforce planner can configure whether or not to enforce a Minimum Required Staff, a Maximum Required Staff, or both a Minimum Required Staff and a Maximum Required Staff for each agent type. The last two columns provide check boxes that indicate whether or not the required staff calculation should enforce absolute limits on the number of agents of the given agent type. For each period of the day, for each agent type, a minimum number of agents and a maximum number of agents is configured in the Simulator user interface. When Minimum Required Staff is checked, the Lower Bound staff returned by a required staff calculation will be greater than or equal to the configured Minimum in each period. When Maximum Required Staff is checked, any Upper Bound staff successfully returned by a required staff calculation will be less than or equal to the configured Maximum. By clicking on any one of the Minimum Required Staff or Maximum Required Staff cells, the user can toggle the check mark and toggle whether or not minimums or maximums will be enforced.

Once the Workforce planner is satisfied with the configuration of the Required staff calculator, the planner launches a required staff calculation by pressing the OK button, which is available on all three tabs. This sends a Calculate( ) command from the user interface to the Required staff calculator.

When the calculation completes, the Required Staff Calculator updates the Simulator User Interface with the results. Specifically, for each agent type and in each period, the estimates of a Lower Bound and an Upper Bound for the required staff can be viewed by the user.

Upon user request, via the Simulator User Interface (306), the user is presented a dialog which allows the user to enter parameters that tune the search for an Upper Bound and a Lower Bound on the required number of agents to be staffed for each agent type, in every period. The user either accepts default values, or selects a preferred Service quality basis, or enters user-preferred values for Window size, Number of runs, Confidence factor, Upper step size, or Lower step size. The user can also choose whether to enforce maximum or minimum limits on staff. If the user Cancels the dialog, nothing happens, apart from the dialog window closing. If the user clicks the OK button, then (1) the Calculator Configuration 312 is modified to match any user initiated changes so that those user-defined values are directly available to the Required Staff Calculator 219 and (2) once the configured values are established in the Calculator Configuration component, the Calculator User Interface sends a command to the Required Staff Calculator to Calculate the staff bounds.

The following are values configured using the Calculator User Interface 314 of the Required Staff Calculator 219 and used by the Required Staff Calculator 219 during a required staff calculation.

Window size, w
Number of runs, n
Confidence factor, c
Upper step size, uss
Lower step size, lss
For each agent-type, i, a Boolean value $\text{EnforceMinStaff}_i$ indicating whether $\text{MinimumAveragePositionsStaffed}_{i,t}$ should be enforced in all periods, t
For each agent-type, i, a Boolean value $\text{EnforceMaxStaff}_i$ indicating whether $\text{MaximumAveragePositionsStaffed}_{i,t}$ should be enforced in all periods, t
For each contact-type, j, a service quality basis, $SQB_j$, where the value of $SQB_j$ is any one of Average delay, Service level percent, Average customer waiting for attention time, Customer waiting for attention service level percent, Average customer waiting for reply time, or Customer waiting for reply service level percent.

The following values are configured using the Simulator User Interface 306, stored in Simulator Configuration 308, where they can be retrieved by the Required Staff Calculator 219.

The number of periods the in simulated day, P. Let t in $\{1, 2, 3, \ldots, P\}$ index the periods of the day.

The number of contact-types in the simulated day, k. Let j in $\{1, 2, 3, \ldots, k\}$ index the contact types.

The number of agent-types in the simulated day, m. Let i in $\{1, 2, 3, \ldots, m\}$ index the agent types.

For each contact-type, j, an ordered list, $H_j$, of a subset of the agent types, $\{1, 2, 3, \ldots, m\}$ such that the numbers in $H_j$ index all and only those agent types that are an appropriate match for and potentially may be routed contacts of type j. For each contact type, j, the number of associated agent-types in $H_j$, NumberOfAssociatedAgentTypes$_j$.

For the service quality basis, Average Delay, for each contact-type, j, and each period, t, a service quality goal, AverageDelayGoal$_{jt}$.

For the service quality basis, Service Level Percent, for each contact-type, j, and each period, t, a service quality goal, ServiceLevelPercentGoal$_{jt}$.

For the service quality basis, Average Customer Waiting for Attention Time, for each contact-type, j, and each period, t, a service quality goal, AverageCustomerWaitingForAttentionTimeGoal$_{jt}$.

For the service quality basis, Customer Waiting for Attention Service Level Percent, for each contact-type, j, and each period, t, a service quality goal, CustomerWaitingForAttentionServiceLevelPercentGoal$_{jt}$.

For the service quality basis, Average Customer Waiting for Reply Time, for each contact-type, j, and each period, t, a service quality goal, AverageCustomerWaitingForReplyTimeGoal$_{jt}$.

For the service quality basis, Customer Waiting for Reply Service Level Percent, for each contact-type, j, and each period, t, a service quality goal, CustomerWaitingForReplyServiceLevelPercentGoal$_{jt}$.

For each agent-type, i, and each period, t, the number of agents available to serve contacts, AveragePositionsStaffed$_{jt}$.

For each agent-type, i, and each period, t, a possible constraint on the minimum number of agents available to serve contacts, MinimumAveragePositionsStaffed$_{jt}$.

For each agent-type, i, and each period, t, a possible constraint on the maximum number of agents available to serve contacts, MaximumAveragePositionsStaffed$_{jt}$.

The Required Staff Calculator 219 component of the Required Staff Module 304 obtains some configuration data from the external Simulator Configuration Module 308. Configuring a general Simulator requires a potentially large amount of detail, depending upon the sophistication of the simulation it embodies. Nevertheless, the Required Staff Calculator 219 gets by with a short list of configuration details that should be available for any practical simulator that routes different types of contacts to different types of agents.

Specifically, (1) the Simulator may report simulated outcomes by period so there is a notion of periods in a day. (2) the simulator may aggregate reports about agents into agent types that reflect agent skills. (3) the simulator may aggregate reports about contacts into reports about contact types. (4) the simulator may report various measures of service quality for each contact type by period of the day. (5) the Simulator is configured, via the Simulator Configuration component and independently of any staff calculations, for some intended/scheduled staff that can be described as a number of agents of a given agent type in each period. (6) Finally, the Simulator may report, for any contact type a list of all the agent types that can handle contacts of that contact type.

The Required Staff Calculator 219 has the following methods for retrieving specific data from the Simulator Configuration 308 component.

getNumberOfPeriods( ) returns a positive integer, P, representing the number of periods in the simulation. Each period of the simulation can then be identified by some integer $t \in \{1, 2, \ldots, P\}$ getNumberOfContactTypes( ) returns a positive integer, k, representing the number of contact types configured in the simulation. Each agent type can then be identified by some integer $j \in \{1, 2, \ldots, k\}$ getNumberOfAgentTypes( ) returns a positive integer, m, representing the number agent types configured in the simulation. Each agent type can then be identified as some integer $i \in \{1, 2, \ldots, m\}$ getAssociatedAgentTypes(contactType) returns an ordered list of agent-type indices that identifies all and only those agent-types that can handle contacts from a given contact-type. getAssociatedAgentTypes(j) returns the list of agent-types for contact-type j.

getNumberOfAssociatedAgentTypes(contactType) returns the number of agent-type indices in the list of agent-types associated with a given contact-type. getNumberOfAssociatedAgentTypes (j) returns the number of agent-types in getAssociatedAgentTypes(j).

getAverageDelayGoal(contactType, period) returns a non-negative real number representing the configured Average Delay Goal (in seconds) for a particular contact-type and period, so that getAverageDelayGoal(j,t) returns the value of AverageDelayGoal$_{jt}$ for contact-type j during period t.

getServiceLevelPercentGoal(contactType, period) returns a real number between 0 and 100 representing the Service Level Goal's configured Service Level Percent for a particular contact-type and period, so that getServiceLevelPercentGoal(j,t) returns the value of ServiceLevelPercentGoal$_{jt}$ for contact-type j during period t.

getAverageCustomerWaitingforAttentionTimeGoal(contactType, period) returns a non-negative real number representing the configured Average Delay Goal (in seconds) for a particular contact-type and period, so that getAverageCustomerWaitingforAttentionTimeGoal(j,t) returns the value of AverageCustomerWaitingForAttentionTimeGoal$_{jt}$ for contact-type j during period t.

getCustomerWaitingforAttentionServiceLevelGoal(contactType, period) returns a real number between 0 and 100 representing the Customer Waiting for Attention Service Level Goal's configured Percent for a particular contact-type and period, so that getCustomerWaitingforAttentionServiceLevelPercentGoal(j,t) returns the value of CustomerWaitingForAttentionServiceLevelPercentGoal$_{jt}$ for contact-type j during period t.

getAverageCustomerWaitingforReplyTimeGoal(contactType, period) returns a non-negative real number representing the configured Average Customer Waiting for Reply Time Goal (in seconds) for a particular contact-type and period, so that getAverageCustomerWaitingforReplyTimeGoal(j,t) returns the value of AverageCustomerWaitingForReplyTimeGoal$_{jt}$ for contact-type j during period t.

getCustomerWaitingForReplyServiceLevelPercentGoal (contactType, period) returns a real number between 0 and 100 representing the Customer Waiting for Reply Service Level Goal's configured Percent for a particular contact-type and period, so that getCustomerWaitingforReplyServiceLevelPercentGoal(j,t) returns the value of CustomerWaitingForReplyServiceLevelPercentGoal$_{jt}$ for contact-type j during period t.

getAveragePositionsStaffed(agentType, period) returns a non-negative real number representing the average number of agents configured to staff a particular agent-type in some period, so that getAveragePositionsStaffed(i,t) returns the value of AveragePositionsStaffed$_{it}$ for agent-type i during period t.

getMinimumAveragePositionsStaffed(agentType, period) returns a non-negative integer that is a possible minimum number of agents for the required staff lower bound returned by a required staff calculation. getMinimumAveragePositionsStaffed(i,t) returns the value of MinimumAveragePositionsStaffed$_{it}$ for agent-type i during period t.

getMaximumAveragePositionsStaffed(agentType, period) returns a non-negative integer that is a possible maximum number of agents for the required staff upper bound returned by a staff required staff calculation. getMaximumAveragePositionsStaffed(i,t) returns the value of MaximumAveragePositionsStaffed$_{it}$ for agent-type i during period t.

The Required staff calculator needs to configure the Simulator in order to be able to test candidate upper and lower staff bounds. The Required Staff Calculator has four methods, that accomplish this configuration of the simulator.

configureSimStaff(numberOfAgents, agentType, period) configures the number of agents of an agent-type that will be available to handle contacts in some period of the simulation. The number of agents is a non-negative real number. For example, configureSimStaff(42.0, i,t) will configure the Simulator with 42 agents of agent-type i during period t.

configureSimStartPeriod(period) configures the Simulator to begin simulations at the given period.

configureSimStopPeriod(period) configures the Simulator to end simulations at the given period.

configureSimNumberOfRuns(numberOfRuns) configures the Simulator to simulate multiple runs and collect statistics based on that number of simulation runs.

Once the Required staff calculator has configured the Simulator, the calculator invokes the simulator's Simulate( ) method. That invocation launches the simulation process. Once the configured number of runs has completed, the Required staff calculator retrieves the quality of service results from the simulator and compares those results with the goals using a confidence test.

The following Simulator results may be used by the Required staff calculator:
For each contact-type, j, and each period of the simulated day, t, values for
AverageAverageDelay$_{jt}$
AverageRemainingAverageDelay$_{jt}$
AverageServiceLevelPercent$_{jt}$
AverageRemainingServiceLevelPercent$_{jt}$
AverageAverageCustomerWaitingForAttentionTime$_{jt}$
AverageRemainingAverageCustomerWaitingForAttentionTime$_{jt}$
AverageCustomerWaitingForAttentionServiceLevelPercent$_{jt}$
AverageRemainingCustomerWaitingForAttentionServiceLevelPercent$_{jt}$
AverageAverageCustomerWaitingForReplyTime$_{jt}$
AverageRemainingAverageCustomerWaitingForReplyTime$_{jt}$
AverageCustomerWaitingForReplyServiceLevelPercent$_{jt}$
AverageRemainingCustomerWaitingForReplyServiceLevelPercent$_{jt}$
StandardDeviationOfAverageDelay$_{jt}$
StandardDeviationOfRemainingAverageDelay$_{jt}$
StandardDeviaionOfServiceLevelPercent$_{jt}$
StandardDeviationOfRemainingServiceLevelPercent$_{jt}$
StandardDeviationOfAverageCustomerWaitingForAttentionTime$_{jt}$
StandardDeviationOfRemainingAverageCustomerWaitingForAttentionTime$_{jt}$
StandardDeviationOfCustomerWaitingForAttentionServiceLevelPercent$_{jt}$
StandardDeviationOfRemainingCustomerWaitingForAttentionServiceLevelPercent$_{jt}$
StandardDeviationOfAverageCustomerWaitingForReplyTime$_{jt}$
StandardDeviationOfRemainingAverageCustomerWaitingForReplyTime$_{jt}$
StandardDeviationOfCustomerWaitingForReplyServiceLevelPercent$_{jt}$
StandardDeviationOfRemainingCustomerWaitingForReplyServiceLevelPercent$_{jt}$ For each agent-type, i, and each time period, t, values for AverageAverageTotalConcurrency$_{it}$ The Required staff calculator has corresponding methods to retrieve those values after the simulator has completed the configured number of simulation runs including the following.
getAveAverageDelay(contactType, period)
getAveRemainingAverageDelay(contactType, period)
getAveServiceLevelPercent(contactType, period)
getAveRemainingServiceLevelPercent(contactType, period)
getAveAverageCustomerWaitingForAttentionTime(contactType, period)
getAveRemainingAverageCustomerWaitingForAttentionTime(contactType, period)
getAveCustomerWaitingForAttentionServiceLevelPercent (contactType, period)
getAveRemainingCustomerWaitingForAttentionServiceLevelPercent(contactType, period)
getAveAverageCustomerWaitingForReplyTime(contactType, period)
getAveRemainingAverageCustomerWaitingForReplyTime (contactType, period)
getAveCustomerWaitingForReplyServiceLevelPercent (contactType, period)
getAveRemainingCustomerWaitingForReplyServiceLevelPercent(contactType, period)
getStdDevAverageDelay(contactType, period)
getStdDevRemainingAverageDelay(contactType, period)
getStdDevServiceLevelPercent(contactType, period)
getStdDevRemainingServiceLevelPercent(contactType, period)
getStdDevAverageCustomerWaitingForAttentionTime(contactType, period)
getStdDevRemainingAverageCustomerWaitingForAttentionTime(contactType, period)
getStdDevCustomerWaitingForAttentionServiceLevelPercent(contactType, period)
getStdDevRemainingCustomerWaitingForAttentionServiceLevelPercent(contactTy pe, period)
getStdDevAverageCustomerWaitingForReplyTime(contactType, period)
getStdDevRemainingAverageCustomerWaitingForReplyTime(contactType, period)

getStdDevCustomerWaitingForReplyServiceLevelPercent (contactType, period)
getStdDevRemainingCustomerWaitingForReplyService-LevelPercent(contactType, period)
getTotalConcurrency(agentType, period)

Some of the methods to retrieve the Simulator results may be described as follows:

For a given contact type and period of the day, getAveAverageDelay(contactType, period) returns to the Required Staff Calculator the average, over the number of runs, of the Average Delay statistic. The value is computed by the Simulator; this method just gets it.

For a given contact type and period of the day, getAveRemainingAverageDelay(contactType, period) returns to the Required Staff Calculator the average, over the number of runs, of the Remaining Average Delay statistic. The value is computed by the Simulator; this method just gets it. The Remaining Average Delay in any run is defined as the total time-in-queue of all contacts in the contact type's queue at the end of the given period, divided by the total number of contacts in that queue at the end of the period. The Required Staff Calculator uses this statistic to insure it is possible to meet the Average Delay goals in the next period.

For a given contact type and period of the day, getAveServiceLevelPercent(contactType, period) returns to the Required Staff Calculator the average, over the number of runs, of the Service Level Percent statistic. The value is computed by the Simulator; this method just gets it.

For a given contact type and period of the day, getAveRemainingServiceLevelPercent(contactType,period) returns to the Required Staff Calculator the average, over the number of runs, of the forecast group's Remaining Service Level Percent statistic. The value is computed by the simulator; this method just gets it. In any run, the Remaining Service Level Percent statistic is a number between 0 and 1 expressed as a percent. It is defined as a fraction whose numerator is the difference between the Remaining Queued and the Overdue Queued and whose denominator is defined to be the Remaining Queued. The Remaining Queued is the number of contacts in the contact type's queue at the end of the period. The Overdue Queued is the number contacts in the contact type's queue at the end of the period that have been in the queue so long, they already exceed the Service Level Goal Seconds of the next period. The Required Staff Calculator uses this statistic to insure it is possible to meet the Service Level Percent goals in the next period.

For a given contact type and period of the day, getStdDevAverageDelay(contactType,period) returns to the Required Staff Calculator the sample standard deviation, over the number of runs, of the Average Delay statistic. The value is computed by the Simulator; this method just gets it. When there is only one run in the simulation, the value is set to 0.

For a given contact type and period of the day, getStdDevRemainingAverageDelay(contactType,period) returns to the Required Staff Calculator the sample standard deviation, over the number of runs, of the Remaining Average Delay statistic. The value is computed by the Simulator; this method just gets it. When there is only one run in the simulation, the value is set to 0.

For a given contact type and period of the day, getStdDeServiceLevelPercent(contactType,period) returns to the Required Staff Calculator the sample standard deviation, over the number of runs, of the Service Level Percent statistic. The value is computed by the Simulator; this method just gets it. When there is only one run in the simulation, the value is set to 0.

For a given contact type and period of the day, getStdDevRemainingServceLevelPercent(contactType,period) returns to the Required Staff Calculator the sample standard deviation, over the number of runs, of the Remaining Service Level Percent statistic. The value is computed by the Simulator, this method just gets it. When there is only one run in the simulation, the value is set to 0.

Once the Required Staff Calculator has obtained its estimates of lower and upper bounds for a staffing that is expected to meet service goals throughout the day, it uses the Simulator User Interface to report those bounds to the Workforce planner.

For each agent-type, i, and each period, t, a method updateUpperBound(numberOfAgents, agentType, period) that is used to update the Simulator's user interface with the required staff upper bound found by the Required staff calculator for the given agent-type and period of the day.

For each agent-type, i, and each period, t, a method updateLowerBound(numberOfAgents, agentType, period) that is used to update the Simulator's user interface with the required staff lower bound found by the Required staff calculator for the given agent-type and period of the day.

If the Required staff calculator determines that some service quality goal in some period is infeasible, it aborts the calculation of required staff and returns an error message to the user.

In order to obtain upper and lower staff bounds, the Required Staff Calculator runs through the periods of a day, starting with the first, and calculates staff bounds one period at time based on the service goals of the period and the configuration of the Required Staff Calculator. In any period, it starts with an initial lower bound of 0 staff for every agent type in that period. Starting with the Average Positions Staffed configured in the simulator, the Required Staff Calculator tests ever increasing staff levels until it finds a staff level it is "confident" has an expected service quality that meets or exceeds the configured service goals of each contact type in the period. This staff level is taken to be the initial upper bound for the staff in that period. Next, the Required Staff Calculator repeatedly tries to find lesser upper bounds for the period and greater lower bounds for the period by decreasing the staff of individual agent types in an upper bound (using the Upper step size), increasing the staff of individual agent types in a lower bound (using the Lower step size), and applying the confidence test appropriate for the configured Service quality bases, Window size, Number of runs, and Confidence factor. It stops adjusting staff levels of any agent type when either the difference between the upper bound and the lower bound is less than or equal to one, or it has found both a least upper bound and a greatest lower bound, in the sense that reducing by 1 the number of staff of any agent type in a least upper bound fails the appropriate confidence test for an upper bound, and increasing by 1 the number of staff of any agent type in a greatest lower bound fails the appropriate confidence test for a lower bound.

The Required staff calculator finds a greatest lower bound and a least upper bound for the required staff. After the Workforce planner issues the Calculate( ) command to the Required staff calculator, there is an initialization phase as the calculator builds data structures and methods from the configuration of both the Required staff calculator and the Simulator.

Upon the call to Calculate, the Required Staff Calculator begins the initialization process and copies the data it needs from the Simulator Configuration into local variables, as follows.

The required staff calculator sets P=getNumberOfPeriods( ), m=getNumberOfAgentTypes( ), and k=getNumberOfContactTypes( ).

The calculator creates and initializes a vector of k values, $$H = \begin{pmatrix} H_1 \\ H_2 \\ \vdots \\ H_k \end{pmatrix} = \begin{pmatrix} 0 \\ 0 \\ \vdots \\ 0 \end{pmatrix},$$

and then
sets $H_j$=getAssociatedAgentTypes(j), for all j∈{1, 2, ..., k}. Here, each H is an ordered list of agent-type. As a convenient notation, define H(j) by rule H(j)=$H_j$ for all j∈{1, 2, ..., k}.

The calculator creates and initializes a k×P matrix of service goals, $$G = \begin{pmatrix} G_{11} & G_{12} & \cdots & G_{1(P-1)} & G_{1P} \\ G_{21} & G_{22} & \cdots & G_{2(P-1)} & G_{2P} \\ \vdots & \vdots & \ddots & \vdots & \vdots \\ G_{(k-1)1} & G_{(k-1)2} & \cdots & G_{(k-1)(P-1)} & G_{(k-1)P} \\ G_{k1} & G_{k2} & \cdots & G_{k(P-1)} & G_{kP} \end{pmatrix} = \begin{pmatrix} 0 & 0 & \cdots & 0 & 0 \\ 0 & 0 & \cdots & 0 & 0 \\ \vdots & \vdots & \ddots & \vdots & \vdots \\ 0 & 0 & \cdots & 0 & 0 \\ 0 & 0 & \cdots & 0 & 0 \end{pmatrix}.$$

Each contact-type, j, has a service quality basis, $SQB_j$, that is configured in the user interface of the Required staff calculator. For each j∈{1, 2, ..., k}, the value of $SQB_j$ can be configured to be any one of Average delay, Service level percent, Average customer waiting for attention time, Customer waiting for attention service level percent, Average customer waiting for reply time, or Customer waiting for reply service level percent. The matrix of service goals, G, is then populated with service quality goals configured in the simulator. In the j th row of G, the values of the goals are to be for the service quality basis $SQB_j$ configured in the required staff calculator for contact-type j. More specifically,

```
For all j ∈ {1, 2, ..., k},
{       if SQB_j = Average delay then
    {       for t ∈ {1, 2, ..., P}
        { set G_jt = getAverageDelayGoal(j, t) }
        }
    else if SQB_j = Service level percent then
    {       For t ∈ {1, 2, ..., P}
        { set G_jt = getServiceLevelPercentGoal(j, t) }
        }
    else if SQB_j = Average customer waiting for attention time then
    {       for t ∈ {1, 2, ..., P}
        { set G_ji = getAverageCustomerWaitingForAttentionTimeGoal(j, t) }
        }
    else if SQB_j = Customer waiting for attention service level percent then
    {       for t ∈ {1, 2, ..., P}
        { set G_jt =
            getCustomerWaitingForAttentionServiceLevelPercentGoal(j, t) }
        }
    else if SQB_j = Average customer waiting for reply time then
    {       for each t ∈ {1, 2, ..., P}
        { set G_jt = getAverageCustomerWaitingForReplyTimeGoal(j, t) }
        }
    else if SQB_j = Customer waiting for reply service level percent then
    {       for each t ∈ {1, 2, ..., P}
        {   set G_jt =
            getCustomerWaitingForReplyServiceLevelPercentGoal(j, t) }
        }
}
```

As a convenient notation let's define the function, $G_j(t)$, by the rule, $G_j(t)=G_{jt}$, for all j∈{1, 2, ..., k} and all t∈{1, 2, ..., P}. As an added convenience, let the domain of function, $G_j(t)$, be extended to be defined at t=P+1 by the rule $G_j(P+1)=G_{jP}$. This is done so that each period t∈{1, 2, ..., P} has, effectively, a defined service quality goal in the next period, t+1.

The Required staff calculator creates and initializes an m×P matrix of the Average Positions Staffed, $$A = \begin{pmatrix} A_{11} & A_{12} & \cdots & A_{1(P-1)} & A_{1P} \\ A_{21} & A_{22} & \cdots & A_{2(P-1)} & A_{2P} \\ \vdots & \vdots & \ddots & \vdots & \vdots \\ A_{(m-1)1} & A_{(m-1)2} & \cdots & A_{(m-1)(P-1)} & A_{(m-1)P} \\ A_{m1} & A_{m2} & \cdots & A_{m(P-1)} & A_{mP} \end{pmatrix} = \begin{pmatrix} 0 & 0 & \cdots & 0 & 0 \\ 0 & 0 & \cdots & 0 & 0 \\ \vdots & \vdots & \ddots & \vdots & \vdots \\ 0 & 0 & \cdots & 0 & 0 \\ 0 & 0 & \cdots & 0 & 0 \end{pmatrix},$$

and then
sets $A_{it}$=getAveragePositionsStaffed (i,t) for all i∈{1, 2, ..., m} and all t∈{1, 2, ..., P}.
That is:
For each i∈{1, 2, ..., m}
 { For each t∈{1, 2, ..., P}
  { set $A_{it}$=getAveragePositionsStaffed(i,t)}
 }

As a convenient notation, define $A_i(t)$ by the rule, $A_i(t)=A_{it}$, for all i∈{(1, 2, ..., m} and all t∈{1, 2, ..., P}.

The Required staff calculator then creates and initializes an m×P matrix of the Minimum Positions Staffed, $$MinPS = \begin{pmatrix} MinPS_{11} & MinPS_{12} & \cdots & MinPS_{1(P-1)} & MinPS_{1P} \\ MinPS_{21} & MinPS_{22} & \cdots & MinPS_{2(P-1)} & MinPS_{2P} \\ \vdots & \vdots & \ddots & \vdots & \vdots \\ MinPS_{(m-1)1} & MinPS_{(m-1)2} & \cdots & MinPS_{(m-1)(P-1)} & MinPS_{(m-1)P} \\ MinPS_{m1} & MinPS_{m2} & \cdots & MinPS_{m(P-1)} & MinPS_{mP} \end{pmatrix} = \begin{pmatrix} 0 & 0 & \cdots & 0 & 0 \\ 0 & 0 & \cdots & 0 & 0 \\ \vdots & \vdots & \ddots & \vdots & \vdots \\ 0 & 0 & \cdots & 0 & 0 \\ 0 & 0 & \cdots & 0 & 0 \end{pmatrix}$$

and then sets $MinPS_{it}$ equal to the Minimum Positions Staffed configured in the simulator for contact-type i and for period t, for all i∈{1, 2, ..., m} and all t∈{1, 2, ..., P}. That is, For each i∈{1, 2, ..., m}
 { For each t∈{1, 2, ..., P}
  set $MinPS_{it}$=getMinimumAveragePostionsStaffed(i,t)}
 }
As a convenient notation, let's define $MinPS_i(t)$ by the rule, $MinPS_i(t)=MinPS_{it}$, for all i∈{1, 2, ..., m} and all t∈{1, 2, ..., P}.

The required staff calculator creates and initializes an m×P matrix of the Maximum Positions Staffed, $$MaxPS = \begin{pmatrix} MaxPS_{11} & MaxPS_{12} & \ldots & MaxPS_{1(P-1)} & MaxPS_{1P} \\ MaxPS_{21} & MaxPS_{22} & \ldots & MaxPS_{2(P-1)} & MaxPS_{2P} \\ \vdots & \vdots & \ddots & \vdots & \vdots \\ MaxPS_{(m-1)1} & MaxPS_{(m-1)2} & \ldots & MaxPS_{(m-1)(P-1)} & MaxPS_{(m-1)P} \\ MaxPS_{m1} & MaxPS_{m2} & \ldots & MaxPS_{m(P-1)} & MaxPS_{mP} \end{pmatrix} = \begin{pmatrix} 0 & 0 & \ldots & 0 & 0 \\ 0 & 0 & \ldots & 0 & 0 \\ \vdots & \vdots & \ddots & \vdots & \vdots \\ 0 & 0 & \ldots & 0 & 0 \\ 0 & 0 & \ldots & 0 & 0 \end{pmatrix}.$$

and then sets $MaxPS_{it}$ equal to the Maximum Positions Staffed configured in the simulator for contact-type i and for period t, for all i∈{1, 2, . . . , m} and all t∈{1, 2, . . . , P}. That is,
For each i∈{1, 2, . . . , m}
{ For each t∈{1, 2, . . . , P}
  { set $MaxPS_{it}$=getMaximumAveragePostionsStaffed(i,t)}
}
As a convenient notation, let's define $MaxPS_i(t)$ by the rule, $MaxPS_i(t)=MaxPS_{it}$, for all i∈{1, 2, . . . , m} and all t∈{1, 2, . . . , P}.

In order to perform confidence tests to decide if some level of staffing is either an upper bound for the required staff or a lower bound for the required staff, the Required staff calculator uses four different tests or predicates that return values of either true or false. Two of the predicates are used when the service quality basis for contacts measures the average duration of the delays in service, as in Average Delay, Average Customer Waiting for Attention Time, and Average Customer Waiting for Reply Time. One of those predicates, DelayTypeUpperPredicate, tests whether a staffing is an upper bound, while the other, DelayTypeLowerPredicate, tests whether a staffing is a lower bound. The other two predicates are used when the service quality basis for contacts measures the percent of delays that are less than a configured duration, as in Service Level Percent, Customer Waiting for Attention Service Level Percent, and Customer Waiting for Reply Service Level Percent. One of those predicates, ServiceLevelTypeUpperPredicate, tests whether a staffing is an upper bound, while the other, ServiceLevelTypeLowerPredicate, tests whether a staffing is a lower bound.

In each of the following predicates, n is the number simulator runs used to estimate service quality and c is the confidence factor, j is the index of some contact-type, and t is some period of the day being simulated. Here, the values of n and c are both configured in the user interface of the Required staff calculator. Let g be the service quality goal for service quality basis $SQB_j$ for contact-type, j, in period, t, and let g' be the service quality goal for service quality basis $SQB_j$ for contact-type, j, in period t+1. If t+1 is greater than the number of periods in the day, then g' is taken to be the service quality goal for the last period in the day. Here the values of the goals g and g' are configured in the user interface of the Simulator and are retrieved by the Required staff calculator from the Simulator configuration.

Let $\bar{x}$ be the average, over n simulator runs, of the service quality measure for service quality basis $SQB_j$ for contact-type, j, in period t.
Let $\bar{r}$ be the average, over n simulator runs, of the remaining service quality measure for service quality basis $SQB_j$, for contact-type, j, in period t.
Let $s_x$ be the sample standard deviation, over n simulator runs, of the service quality measure for service quality basis $SQB_j$, for contact-type, j, in period t.
Let $s_r$ be the sample standard deviation, over n simulator runs, of the remaining service quality measure for service quality basis $SQB_j$, for contact-type, j, in period t,
Here $\bar{x}, \bar{r}, s_x$, and $s_r$, are the results of n simulations orchestrated by the Required staff calculator, which results are retrieved the Required staff calculator.
The DelayTypeUpperPredicate returns true only when the staff levels configured in the simulator are expected to meet the quality of service goal for contact-type, j, in period, t. It is defined as follows.

DelayTypeUpperPredicate($\bar{x},\bar{r},s_x,s_r,g,g',c,n$)
{ Set $\nu = \max\left\{0, g - c\dfrac{s_x}{\sqrt{n}}\right\}$.

Set $\rho = \max\left\{0, g' - c\dfrac{s_r}{\sqrt{n}}\right\}$.

If $\bar{x} \leq \nu$ and $\bar{r} \leq \rho$ then return true, otherwise return false.
}

The DelayTypeLowerPredicate returns true only when the staff levels configured in the simulator are expected to fail to meet the quality of service goal for contact-type, j, in period, t. It is defined as follows.

DelayTypeLowerPredicate($\bar{x},s_x,g,c,n$)
{
Set $\nu = g + c\dfrac{s_x}{\sqrt{n}}$ If $\bar{x} \geq \nu$ then return true, otherwise return false
}

The ServiceLevelTypeUpperPredicate returns true only when the staff levels configured in the simulator are expected to meet the quality of service goals for contact-type, j, in period, t.

ServiceLevelTypeUpperPredicate($\bar{x},\bar{r},s_x,s_r,g,g',c,n$)
{
Set $\nu = \min\left\{g + c\dfrac{s_x}{\sqrt{n}}, 100\right\}$.

Set $\rho = \min\left\{g' + c\dfrac{s_r}{\sqrt{n}}, 100\right\}$

If $\bar{x} \geq \nu$ and $\bar{r} \geq \rho$ then return true, otherwise return false. }

The ServiceLevelTypeLowerPredicate returns true only when the staff levels configured in the simulator are expected to fail to meet the quality of service goals for contact-type, j, in period, t. It is defined as follows.

ServiceLevelTypeLowerPredicate($\bar{x},s_x,g,c,n$){
Set $\nu = \max\left\{0, g - c\dfrac{s_x}{\sqrt{n}}\right\}$

```
       If x̄ ≤ v then return true, otherwise return false.
}
```

The delay type and the service level type predicates are combined to make an upper service predicate and a lower service predicate in the Required staff calculator that are used to perform confidence tests for the quality of service experience by any contact-type in any period of the day. These are defined as follows.

The UpperServicePredicate returns true only when the staff levels configured in the simulator are expected to meet the quality of service goals for contact-type, j, in period, t. It is defined as follows:

UpperServicePredicate(j,t)
{ If $SQB_j$=AverageDelay then
   return DelayTypeUpperPredicate(
   getAveAverageDelay(j,t),
   getAveRemainingAverageDelay(j,t),
   getStdDevAverageDelay(j,t),
   getStdDevRemainingAverageDelay(j,t),
   $G_j(t), G_j(t+1)$, c, n)
  else if $SQB_j$=ServiceLevelPercent then
   return ServiceLevelTypeUpperPredicate(
   getAveServiceLevelPercent(j,t),
   getAveRemainingServiceLevelPercent(j,t),
   getStdDevServiceLevelPercent(j,t),
   getStdDevRemainingServiceLevelPercent(j,t)
   $G_j(t), G_j(t+1)$, c, n)
  else if $SQB_j$=AverageCustomerWaitingForAttentionTime then
   return DelayTypeUpperPredicate (
   getAveAverageCustomerWaitingForAttenionTime(j,t),
   getAveRemainingACustomerWaitingForAttentionTime (j,t),
   getStdDevAverageCustomerWaitingForAttentionTime(j,t),
   getStdDevRemainingAverageCustomerWaitingForAttentionTime (j,t),
   $G_j(t), G_j(t+1)$, c, n)
  else if $SQB_j$=Customer WaitingForAttentionServiceLevelPercent then
   return ServiceLevelTypeUpperPredicate(
   getAveCustomerWaitingForAttentionServiceLevelPercent(j,t),
   getAveRemainingCustomerWaitingForAttentionServiceLevelPercent(j,t),
   getStdDevCustomerWaitingForAttentionServiceLevelPercent(j,t),
   getStdDevRemainingCustomerWaitingForAttentionSeviceLevelPercent(j,t),
   $G_j(t), G_j(t+1)$, c, n)
  else if $SQB_j$=AverageCustomerWaitingForReplyTime then
   return DelayTypeUpperPredicate(
   getAveAverageCustomerWaitingForReplyTime(j,t),
   getAveRemainingAverageCustomerWaitingForReplyTime(j,t),
   getStdDevAverageCustomerWaitingForReplyTime(j,t),
   getStdDevRemainingAverageCustomerWaitingForReplyTime(j,t),
   $G_j(t), G_j(t+1)$, c,n)
  else if $SQB_j$=Customer WaitingForReplyServiceLevelPercent then
   return ServiceLevelTypeUpperPredicate (
   AveCustomerWaitingForReplyServiceLevelPercent(j,t),
   AveRemainingCustomerWaitingForReplyServiceLevelPercent(j,t),
   StdDevCustomerWaitingForReplyServiceLevelPercent(j,t),
   StdDevRemainingCustomerWaitingForReplyServiceLevelPercent(j,t),
   $G_j(t), G_j(t+1)$, c, n)
}

The LowerServicePredicate returns true only when the staff levels configured in the simulator are expected to fail to meet the quality of service goals for contact-type, j, in period, t. It is defined as follows LowerServicePredicate(j,t)
{If $SQB_j$=AverageDelay then
   return DelayTypeLowerPredicate(
   getAveAverageDelay(j,t),
   getStdDevAverageDelay(j,t),
   $G_j(t)$, c, n)
  else if $SQB_j$=ServiceLevelPercent then
   return ServiceLevelTypeLowerPredicate (
   getAveServiceLevelPercent(j,t),
   getStdDevServiceLevelPercent(j,t),
   $G_j(t)$, c, n)
  else if $SQB_j$=AverageCustomerWaitingForAttentionTime then
   return DelayTypeLowerPredicate (
   getAveAverageCustomerWaitingForAttentionTime(j,t),
   getStdDevAverageCustomerWaitingForAttentionTime(j,t),
   $G_j(t)$, c, n)
  else if $SQB_j$=Customer WaitingForAttentionServiceLevelPercent then
   return ServiceLevelTypeLowerPredicate (
   getAveCustomerWaitingForAttentionServiceLevelPercent(j,t),
   getStdDevCustomerWaitingForAttentionServiceLevelPercent(j,t),
   $G_j(t)$, c, n)
  else if $SQB_j$=AverageCustomerWaitingForReplyTime then
   return DelayTypeLowerPredicate (
   getAveAverageCustomerWaitingForReplyTime(j,t),
   getStdDevAverageCustomerWaitingForReplyTime(j,t),
   $G_j(t)$, c, n)
  else if $SQB_j$=Customer WaitingForReplyServiceLevelPercent then
   return ServiceLevelTypeLowerPredicate (
   getAveCustomerWaitingForReplyServiceLevelPercent(j,t),
   getStdDevCustomerWaitingForReplyServiceLevelPercent(j,t),
   $G_j(t)$,c,n)
}

The Required staff calculator implements a FeasibleGoalPredicate to decide if some service quality goals cannot be met due to either the enforcement of a maximum positions staffed that is too small or that no number of staff is large enough. For contact-type j, in period t, FeasibleGoalPredicate(j,t) returns true if the quality of service goal for j is feasible and returns false if the goal is infeasible. The predicate is described as follows, where ct is a logical variable whose value is either true or false and where $U_a(t)$ is the upper bound staff for agent type a in period t, as described below.

```
FeasibleGoalPredicate(j, t)
{
    Set ct = true
    If UpperServicePredicate(j, t) is false then
    {
        Set ct = false
        For α in H(j)
        {   If EnforceMaxStaff_α is true then
            {   If (getTotalConcurrency(α, t) >= .01) and (U_α(t) <=
                MaxPS_α(t)) then
                {   set ct = true
                    break out of loop over α
                }
            }
            If getTotalConcurrency(α, t) >= .01 then
            {   set ct = true
                break out of loop over α
            }
        }
    }
    return ct
}
```

To support its search for upper and lower bound on required staff, the Required staff calculator needs several internal data structures to hold intermediate results. These structures are also created during initialization.

The Required Staff Calculator creates and initializes an m×P matrix of non-negative integers, L, used to contain the lower bound for the required staff, where $$L = \begin{pmatrix} L_{11} & L_{12} & \ldots & L_{1P} \\ L_{21} & L_{22} & \ldots & L_{2P} \\ \vdots & \vdots & \ddots & \vdots \\ L_{m1} & L_{m2} & \ldots & L_{mP} \end{pmatrix} = \begin{pmatrix} 0 & 0 & \ldots & 0 \\ 0 & 0 & \ldots & 0 \\ \vdots & \vdots & \ddots & \vdots \\ 0 & 0 & \ldots & 0 \end{pmatrix}.$$

It also creates and initializes an m×P matrix of non-negative integers, U, used to contain the upper bound for the required staff, where $$U = \begin{pmatrix} U_{11} & U_{12} & \ldots & U_{1P} \\ U_{21} & U_{22} & \ldots & U_{2P} \\ \vdots & \vdots & \ddots & \vdots \\ U_{m1} & U_{m2} & \ldots & U_{mP} \end{pmatrix} = \begin{pmatrix} 0 & 0 & \ldots & 0 \\ 0 & 0 & \ldots & 0 \\ \vdots & \vdots & \ddots & \vdots \\ 0 & 0 & \ldots & 0 \end{pmatrix}.$$

and an m×P matrix of non-negative integers, Q, used to contain a trial staff, where $$Q = \begin{pmatrix} Q_{11} & Q_{12} & \ldots & Q_{1P} \\ Q_{21} & Q_{22} & \ldots & Q_{2P} \\ \vdots & \vdots & \ddots & \vdots \\ Q_{m1} & Q_{m2} & \ldots & Q_{mP} \end{pmatrix} = \begin{pmatrix} 0 & 0 & \ldots & 0 \\ 0 & 0 & \ldots & 0 \\ \vdots & \vdots & \ddots & \vdots \\ 0 & 0 & \ldots & 0 \end{pmatrix}.$$

Define $L_i(t)$ by the rule $L_i(t)=L_{it}$, $U_i(t)$ by the rule $U_i(t)=U_{it}$, and $Q_i(t)$ by the rule $Q_i(t)=Q_{it}$ for all $i \in \{1, 2, \ldots, m\}$ and all $t \in \{1, 2, \ldots, P\}$. Furthermore, let L(t) denote the $t^{th}$ column of L, U(t) denote the $t^{th}$ column of U, and Q(t) denote the $t^{th}$ column of Q, for all $t \in \{1, 2, \ldots, P\}$.

The Required Staff Calculator creates and initializes four lists of agent types, $G_U$, $\tilde{G}_U$, $G_L$, and $\tilde{G}_L$, that it uses to manage the iterations over agent types when seeking bounds for required staff. Initially, each list of agent types is empty, so that $G_U=[\ ]$, $\tilde{G}_U=[\ ]$, $G_L=[\ ]$, and $\tilde{G}_L=[\ ]$.

The Required Staff Calculator has several numerical variables that it uses for a variety of purposes.

It uses two integer variables, i and i', to index the m agent types, so that the ranges of i and i' are both $\{1, 2, \ldots, m\}$.

It uses the integer variable, j, to index the k contact types, so that the range of j is $\{1, 2, \ldots, k\}$.

It uses the integer variables, t and τ, to index periods of the day, so that the ranges of t and τ are both $\{1, 2, \ldots, P\}$.

It uses the integer variable, α, to range over the all the agent type indices that are associated with a particular contact type.

It uses the integer variable, q, to determine which periods are in a window of periods. Specifically, q=min{τ,w}, where r is a given period of the day and w is the Window size configured in the Calculator User Interface.

It uses the integer variables, r and lastr, to contain a rounded value of staff. Any rounding will be denoted by an explicit rounding function, Round(x), which rounds a real number, x, to a closest integer.

It uses a real scaling factor, sf, when creating a new candidate upper and lower bounds.

It uses an integer variable, F, to act as a fence while searching for new upper or lower bounds.

The Required Staff Calculator uses several logical variables, whose values are either true or false, to control the flow of its calculations.

The logical variable, resimulating, is used to control when the calculator invokes the Simulator.

The logical variable, seeking, is used to control the search for the initial upper bound staffing.

The logical variables, upperFlag and feasible are used to control the search for the initial upper bound staffing.

The logical variable, reducing, is used to control the search for lesser upper bounds.

The logical variable, increasing, is used to control the search for greater lower bounds.

The logical variable, rupdate, is used to control the selection of candidate staff levels that are between a given upper bound and a given lower bound.

The logical variable ct is used by the FeasibleGoalPredicate to hold the outcome of concurrency tests.

After initialization, the Required Staff Calculator begins its search for staff bounds one period at a time, starting with the first period of the day. It organizes this search across all periods using nested iterations. The following is an outline of the sequence of iterations. (The methods for the boxed descriptions are given below.)

For each τ in [1, 2, ..., P]
{
    the Required Staff Calculator sets $G_U=[1, 2, \ldots, m]$, $\tilde{G}_U=[1, 2, \ldots, m]$, $G_L=[2, \ldots, m]$, and $\tilde{G}_L=[1, 2, \ldots, m]$.

It then finds an initial lower bound and an initial upper bound for all the agent types in period τ. That is, it finds initial values for L(τ) and U(τ).

While ($G_U$ is not empty)
    {
        For each $i \in G_U$
        { it either finds a smaller upper bound for agent type i in period r, and updates U(τ), or it removes i from $\tilde{G}_U$ and leaves U(τ) unchanged,

```
}
It sets G_U=G̃_U.
} //end while
While (G_L is not empty)
{
For each i∈G_L
{
``` it either finds a greater lower bound for agent type i in period τ, and updates L(τ), or it removes i from $\tilde{G}_L$ and leaves L(τ) unchanged.

```
}
It sets G_L=G̃_L.
}} // end while, end for
```

The Required Staff Calculator updates the Simulator User Interface's lower
bound staff and the upper bound staff with its current values for L and U.}

The following is how the Required Staff Calculator finds an initial lower bound and an initial upper bound for all the agent types in a period τ.

```
//First find initial lower bound in a period, τ
For each i in [1, 2, . . . , m]
{   If EnforceMinStaff_i is true then
    {  if EnforceMaxStaff_i is true then
       {  set L_i(τ) = min {MinPS_iτ, MaxPS_iτ} }
       else
       {  set L_i(τ) = MinPS_iτ }
    }
    else
    {  set L_i(τ) = 0 }
}
//Check to see if L(τ) is also an upper bound.
Set q = min {τ, w}
For i' in [1, 2, . . . , m]
{   For t in [τ − q + 1, τ − q + 2, . . . , τ − 1]
    {  configureSimStaff (L_i'(τ), i', τ) }
}
configureSimStartPeriod(τ − q + 1)
configureSimStopPeriod(τ)
configureSimNumberOfRuns(n)
Simulate( )
Set upperFlag = true
For t in [τ − q + 1, τ − q + 2, . . . , τ − 1, τ]
{   For j in [1, 2, . . . , k]
    {  If UpperServicePredicate(j, t) is false, then
       {  set upperFlag = false
          break out of this loop over j
       }
    { //end loop over j
    If upperFlag is false, then
    {  break out of this loop over t }
} //end loop over t
If upperFlag is true, then
{   set U(τ) = L(τ) }
else  //try to find initial upper bound for period τ
{
    //Initialize a candidate upper bound based on simulator
    configured APS
    For each i in [1, 2, . . . , m]
    {  If Round (A_i(τ)) > 0 then
       {  set U_i(τ) = Round (A_i(τ)) }
       else
       {  set U_i(τ) = 1 }
       If EnforceMaxStaff_i is true then
       {  set U_i(τ) = min{MaxPS_iτ, U_i(τ)} }
```

```
} //end loop over i
//Seek an initial upper bound
set seeking = true
While (seeking is true)
{ set seeking = false
  //Configure the simulator and run simulations
  set q = min{τ, w}
  For i' in [1, 2, . . . , m]
  { For t in [τ − q + 1, τ − q + 2, . . . , τ − 1, τ]
    {  configureSimStaff (U_i'(t), i', t) }
  }
  configureSimStartPeriod(τ − q + 1)
  configureSimStopPeriod(τ)
  configureSimNumberOfRuns(n)
  Simulate( )
  //Check for infeasible goals
  Set feasible = true
  For t in [τ − q + 1, τ − q + 2, . . . , τ − 1, τ]
  { For j in [1, 2, . . . , k]
    {  if FeasibleGoalPredicate(j, t) is false, then
       {  set feasible = false
          break out of loop over j
       }
    } //end loop over j
    If feasible is false then
    {  break out of loop over t}
  } //end loop over t
  If feasible is false then
  { provide infeasible goals error message and exit required
    staff calculation }
  // goals are not infeasible in every period of the window
  For t in [τ − q + 1, τ − q + 2, . . . , τ − 1, τ]
  { For j in [1, 2, . . . , k]
    {  If UpperServicePredicate(j, t) is false, then
       {  If (t < τ)
          {  For α in H(j)
             {  if EnforceMaxStaff_α is true then
                {  set U_α(t) = min{U_α(t) + 1, MaxPS_αt} }
                else
                {  set U_α(t) = U_α(t) + 1 }
             }
          }
          else
          {  For i in [1, 2, 3, . . . , m]
             {  if EnforceMaxStaffi is true then
                {  set U_i(τ) = min{2 · U_i(τ), MaxPS_iτ} }
                else
                {  set U_i(τ) = 2 · U_i(τ) }
             }
          }
          set seeking = true
          break out of this loop over j
       }
    } //end j loop
    If seeking is true, then
    {  break out of this loop over t }
  } //end t loop
} //end while seeking loop
} //end if upperFlag else
```

At this stage initial upper and lower bounds through period τ have been determined, or it has been determined that an upper bound does not exist because some goals are infeasible.

Given a period, τ, an agent-type, i, in $G_U$, and upper bound for staff, U(t), for all t in [1, 2, . . . , τ], here is how the Required staff calculator either finds a smaller upper bound for agent-type i in period τ, and updates U(τ), or it decides to remove i from $\tilde{G}_U$ and leave U(τ) unchanged.

```
If (U_i(τ) − L_i(τ)) < 2 then
{   remove agent type i from G̃_U }
else
{   set q = min{τ, w}
    For t in [τ − q + 1, τ − q + 2, . . . , τ − 1, τ]
```

-continued

```
{ set Q(t) = U(t) }
set sf = 1
set r = -1
set F = L_i(τ)
set rupdate = true
set reducing = true
While reducing is true
{ set reducing = false
  If rupdate is true then
  { set sf = uss · sf
    set lastr = r
    set r = Round((U_i(τ) - L_i(τ)) · sf)
    if lastr == r then
    { set rupdate = false
      set r = r - 1
    }
  }
  else
  { set r = r - 1 }
  If r > 1 then
  { If (U_i(τ) - F - r) < 1 then
    { set F = F + 1
      set Q_i(τ) = F
    }
    else
    { set Q(τ) = U_i(τ) - r }
  }
  else
  { set Q_i(τ) = U_i(τ) - 1 }
  //Q(r) is now a candidate staffing that is less than U(τ)
  set resimulating = true
  While (resimulating)
  { set resimulating = false
    For i' in [1, 2, ..., m]
    { For t in [τ - q + 1, τ - q + 2, ..., τ - 1, τ]
      { configureSimStaff (Q_i'(t), i', t ) }
    }
    configureSimStartPeriod(τ - q + 1)
    configureSimStopPeriod(τ)
    configureSimNumberOfRuns(n)
    Simulate( )
    For t in [τ - q + 1, τ - q + 2, ..., τ - 1, τ]
    { For j in [1, 2, ..., k]
      { If UpperServicePredicate(j, t) is true then
        { continue with next j }
        else
        { If (t < τ) then
          { if FeasibleGoalPredicate(j, t) is true then
            { For α in H_α(t)
              { If EnforceMaxStaff_α is true then
                { set U_α(t) = min{U_α(t) + 1, MaxPS_αi} }
                else
                { set U_α(t) = U_α(t) + 1 }
              }
              set resimulating = true
            }
            else
            { prompt user with infeasible goals message and exit
              calculation }
          }
          else
          { reducing = true }
          break out of this loop over j
        } //end if UpperServicePredicate
      } //end for j loop
      If resimulating is true or reducing is true then
      { break out of this loop over t
    } //end of loop over t }
    If resimulating is false then
    { break out of the resimulating loop }
  } //end while resimulating loop
  If (((U_i(τ) - Q_i(τ)) < 2 ) and reducing is true)
  { Q_i(τ) = U_i(τ)
    Remove staff group i from G̃_U
    reducing = false
  }
}
```

```
  } //end while reducing loop
  For t in [τ - q + 1, τ - q + 2, ..., τ - 1, τ]
  { U(t) = Q(t) }
{ //end else
```

Given a period, τ, an agent-type, i, in $G_L$, and lower bound for staff, L(t), for all t in [1, 2, ..., τ], the following is how the Required staff calculator either finds a larger lower bound for agent-type i in period τ, and updates L(τ), or it decides to remove i from $\tilde{G}_L$ and leave L(τ) unchanged.

```
If (U_i(τ) - L_i(τ)) < 2 then
{   remove agent type i from G̃_L }
else
{   set q = min{τ, w}
    For t in [τ - q + 1, τ - q + 2, ..., τ - 1]
    {   set Q(t) = U(t) }
    set Q(τ) = L(τ)
    set sf = 1
    set r = -1
    set F = U_i(τ)
    set rupdate = true
    set increasing = true
    While (increasing is true)
    {   set increasing = false
        if rupdate is true then
        {   set sf = sf · lss
            set lastr = r
            set r = Round((U_i(τ) - L_i(τ)) · sf )
            if lastr == r then
            {   set rupdate = false
                set r = r - 1
            }
        }
        else
        {   r = r - 1 }
        if r > 1 then
        {   if (F - L_i(τ) - r) < 1 then
            {   set F = F - 1
                set Q_i(τ) = F
            }
            else
            {   set Q_i(τ) = L_i(τ) + r }
        }
        else
        {   set Q_i(τ) = L_i(τ) + 1}
        For i' in [1, 2, ..., m]
        {   For t in [τ - q + 1, τ - q + 2, ..., τ - 1, τ]
            {   configureSimStaff (Q_i'(t), i', t ) }
        }
        configureSimStartPeriod(τ - q + 1)
        configureSimStopPeriod(τ)
        configureSimNumberOfRuns(n)
        Simulate( )
        For j in [1, 2, ..., k]
        {   if LowerServicePredicate(j, τ) is true then
            {   continue with next j }
            else
            {   set increasing = true
                break out of this loop over j
            }
        } //end for j loop
        If (Q_i(τ) - L_i(τ)) < 2 and increasing is true then
        {   set Q_i(τ) = L_i(τ)
            remove agent-type i from G̃_L
            set increasing = false
        }
    } //end while increasing loop
    L_i(τ) = Q_i(τ)
} //end else
```

The following is how the Required Staff Calculator updates the Simulator User Interface's upper bound staff and the lower bound staff with its final estimates for L and U.
For t in [1, 2, ..., P]
{ For i in [1, 2, ..., m]

{ updateUpperBound ($U_i(t)$, i, t)
updateLowerBound ($L_i(t)$, i, t)
}
}

In general, the Required Staff Module does not require the use of an event-based Monte Carlo simulator. There are any number of simulation or modeling techniques that might be used to describe multi-skill concurrent contacts, such as agent based models, multi-agent systems, continuous-time Markov processes with either finite or countable states, or discrete-time finite Markov chains, and so on. Any non-deterministic technique for estimating service qualities resulting from specified staff levels can support this algorithm to calculate staff bounds, provided (1) In any period, the estimated service quality computed for each contact-type during trials (runs) that use identical staffing for each agent-type, show some random variability from trial (run) to trial (run), so that service qualities can be treated as real random variables with probability distributions that have means and variances.

(2) In any period, for any estimate of the service quality during the period, there is a corresponding estimate of service quality of contacts remaining in the queue at the end of the given period which can be compared to the service quality goal of the next period.

(3) The expected value of the measure of service quality varies monotonically with the staffing level of any agent-type.

(4) It is possible for the Required Staff Module to configure the staff levels used in any estimate of the service qualities.

(5) It is possible for the Required Staff Module to configure the number of times service qualities should be estimated for any given configured staff levels. (Number of Runs)

(6) It is possible for the Required Staff Module to configure the start and stop periods that describe the range of periods for which to perform service quality estimates.

(7) The averages and sample standard deviations of service qualities obtained from repeated trials can be retrieved by the Required Staff Module.

The method for estimating staff bounds described will still work with deterministic techniques for estimating service levels resulting from specified staff levels, provided there is an estimate of service quality and (2), (3), (4), (5), (6), and (7) are also satisfied. In this case, the standard deviations of the service level estimates are all zero, but the UpperPredicates and LowerPredicates that depend on the standard deviations are still well defined and the algorithm embodied in the Required Staff Module can proceed to find lower and upper staff bounds.

The Required Staff Module has been embodied as part of a Staff Calculator for estimating required staff when agents serve concurrent sessions because that is a very important special case of concurrent work, and concurrent work presents complicated staffing issues to the administrators of a contact center. But the Required Staff Module actually knows nothing about chat, or other media types, or the details of concurrent work, as such. All the Required Staff Module knows how to do is adjust staff levels based on an analysis of means and standard deviations of "estimated" service qualities and configured goals. This means the Required Staff Module can be used to estimate upper and lower staff bounds for many kinds of work and many kinds of service goals.

In general, for any kind of work, (concurrent or not)
(1) that can be adequately be described by routing rules associating kinds of offered tasks (task-types) to kinds of agents (agent-types) throughout periods of a day,
(2) for which it is possible to set service quality goals and to estimate expected service quality for the task-types using given staff levels for the agent-types during any period of a day,
(3) for which it is possible to estimate the measure of "remaining" service quality at the end of any period of a day,
(4) for which the expected value of the measures of service quality and remaining service quality are monotonically related to staff levels, and
(5) for which, estimates of average service quality, and estimates of standard deviations of service quality can be computed,
then a simulator or calculator for that type of work can be wrapped up into a Work Estimation module that satisfies the 7 conditions for estimating service qualities in a contact center specified herein above, and supports the component interactions of the Simulator. That Work Estimation module can then replace the Simulator module. Finally, if needed, UpperPredicates and LowerPredicates for new service quality measures can be modified or added to the Required Staff Module and any new type of service quality made an optional service quality basis.

Some defects of the prior methods for estimating required staff are (1) only applicable to single skill concurrent chat, (2) the underlying model of chat dynamics is very simple and does not lend itself to refinements such as agent wrap-up, or break-time, context switching, . . . , (3) methods assume the chat system is in an equilibrium state (i.e., in a steady-state). in each period, or (4) methods assume the concurrency of chat sessions is a known constant throughout each period. In contrast, the disclosed method (1) works for both single-skill and multi-skill concurrent chat and other concurrent media, (2) is indifferent to the complexity of the underlying the model of the dynamics of agent-contact interactions, including whether agents engage in concurrent sessions with multiple contacts, and (3) does not assume the system is at equilibrium.

There are two significant short comings in the approach using concurrency. (1) It is just a workload computation and does not take into account the random variability in when new sessions arrive or the random variability in individual session handle-times so it is difficult to estimate service levels. That variability has dramatic impacts and is the reason Erlang computations rather than workload computations are used in traditional call centers. (2) Even in the case of chat only contacts, both concurrency and session handle time depend in a complicated way on the numbers of different types of chat sessions in the system, the details of the durations and timing of chat message exchanges between agents and contacts, the details of when new chat sessions arrive to the chat system and the number of available agents. In other words, while it is relatively easy to either observe session handle time and concurrency or know what they were in the past, it is not so easy to predict what they will be in the future when conditions will have changed. In contrast, (1) the disclosed method is not a simple workload calculation but rather relies on the simulator to provide estimates of expected service quality and its variability based on detailed simulations of agent and contact interactions. (2) The disclosed method does not use a configured concurrency or configured session handle time. Instead, it relies on the simulator to directly estimate service quality expected from a staffing.

The two main short comings of using the earlier Monte Carlo prototypes to estimate staff are that they (1) supported only one type of agent and (2) represented only one period of a day. Therefore, they were not of general utility for even multi-skilled chat centers. In contrast, the disclosed method supports general routing schemes that associate multiple types of contacts with multiple types of agents communicating in diverse media (including text chat) across multiple periods of the day. Therefore, the current method is of more general utility.

An advantage of using a general Monte Carlo simulation to estimate required staff is that the algorithms seeking to find a staff level that meets the requirements can be made agnostic about the details of the simulation process and its configuration. This means that the staffing algorithm can remain unchanged while the simulator itself evolves from version to version. Among the many other advantages are the potential ability to simulate complex routing rules, the ability to simulate breaks and other scheduled events, the ability to simulate random unscheduled unproductivity, the ability to simulate the variability in contact arrival times, customer and agent message composition times, agent wrap-up times, the ability to simulate the behavior when system that is not at equilibrium, the ability to track sessions that cross period boundaries, the ability to estimate the variability in the number of handled contacts in any given period, and so on. None of these refinements to a simulator impact the method of calculating upper and lower bounds for staff that is disclosed here.

There are significant advantages to the method of calculating required staff disclosed here.

(1) The method supports event-based Monte Carlo simulators, and other non-deterministic simulators which can provide the random variability in the number of contacts handled by agents characteristic of real world concurrent chat or concurrent multimedia.

(2) It is the only method the authors are aware of which can provide reasonable staff estimates for multi-skill chat or concurrent multimedia once the variability in arrival times and handle times intrinsic to chat and concurrent multimedia are taken into account.

(3) The method is not dependent on details of how the simulator works, only that there is a simulator or estimator the Required Staff Module can configure, run, and then observe the resulting service quality. For example, changing routing protocols or the form of probability distributions used in the simulator does not impact the method.

(4) The method described here supports multiple different measures of service quality including Average Delay, Service Level Percent, Average Customer Waiting for Attention Time, Customer Waiting for Attention Service Level Percent, Average Customer Waiting for Reply Time, and Customer Waiting for Reply Service Level Percent. But other measures of quality could be easily supported by the method, by indirection, should the simulator provide them. In particular, concurrent chat suggests some new measures of quality of experience for either customers or agents that depend on staff levels. Among these new measures are concurrency and session handle-time inflation.

(5) The method exploits the variability in outcomes of Monte Carlo simulation, using both means and standard deviations of multiple simulator runs to guide the search for improved staff bounds.

(6) The method provides an interval estimate, rather than a point estimate, of required staff. By providing both upper and lower bounds for a staff level that is expected to meet service goals a user gets a more realistic view of the problem of staffing in the presence of uncertain workloads and brittle service requirements. ("Brittle service requirement" means a small change in staffing yields a dramatic change in service quality.)

(7) Because the Required Staff Calculator can be configured with different window sizes, the method can accommodate session handle times that are longer than the individual periods of the day.

(8) Because the Required Staff Calculator can be configured with different window sizes, the method can accommodate days when the handling of contacts is never at equilibrium because the expected number of offered contacts in any period changes dramatically across periods of the day.

(9) Because the method described here is parameterized, a user can balance confidence and precision of results against performance.

The performance of the method described here is at the mercy of the performance of the simulator it uses.

Figure 5:
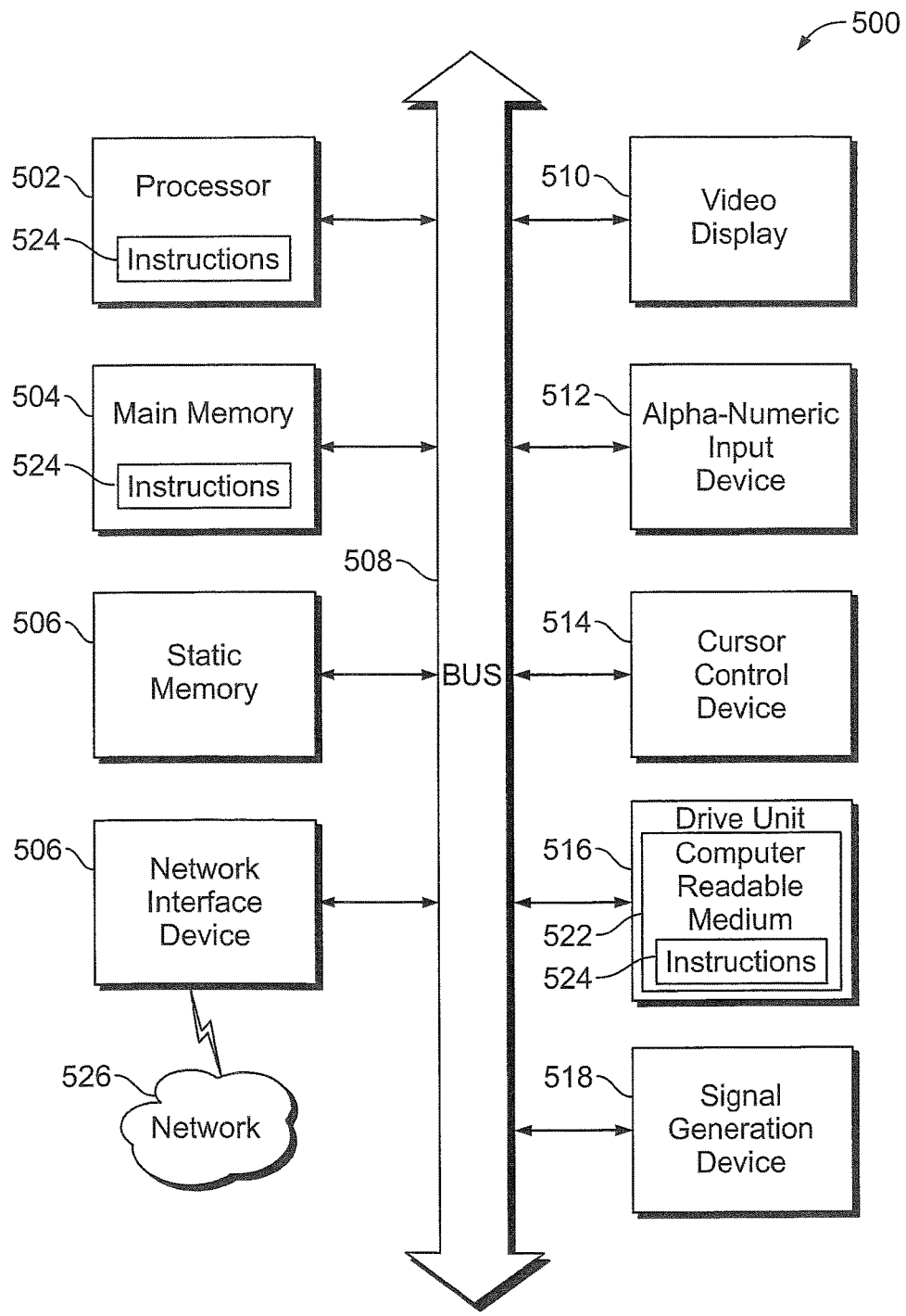
FIG. 5 is a block diagram of a machine form of an example computer system within which a set of instructions for causing the machine to perform any one or more of the methodologies discussed herein may be executed or stored.

FIG. 5 shows a block diagram of a machine in the example form of a computer system 500 within which a set of instructions may be executed causing the machine to perform any one or more of the methods, processes, operations, or methodologies discussed herein. For example, the contact center 201, the WFM system 202 and the ACD 209 may include the functionality of the one or more computer systems 500.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 further includes a video display unit 510 (e.g., a liquid crystal display (LCD) plasma, or a cathode ray tube (CRT)). The computer system 500 also includes an alphanumeric input device 512 (e.g., a keyboard), a cursor control device 514 (e.g., a mouse), a drive unit 516, a signal generation device 518 (e.g., a speaker) and a network interface device 520.

The drive unit 516 includes a computer-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting computer-readable media. The software 524 may further be transmitted or received over a network 526 via the network interface device 520.

While the computer-readable medium 522 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, transitory and non-transitory media. Examples of non-transitory media include but are not limited to solid-state memories, optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

The inventive subject matter may be represented in a variety of different embodiments of which there are many possible permutations. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. An electronic contact management system for managing a plurality of electronic multimedia contacts and a plurality of multi-skilled agents comprising:
an automatic contact distribution system including a contact routing platform to allocate at least some of the plurality of electronic multimedia contacts to suitable agents of the plurality of agents on an appropriate communications medium;
a historical database coupled to the automatic contact distribution system which stores records of customer and agent interactions;
an adapter, coupled to the historical database through a communications network and coupled to a workforce management database, which regularly updates the workforce management database with records of agents and customer contact management from the historical database;
a forecaster, coupled to the workforce management database, which uses historical data from the workforce management database to produce forecasts of types and amounts of future customer contacts predicted to arrive at the contact management system on a future date and of how long an agent will take to service the future customer contacts, and which stores the forecasts in the workforce management database;
a scheduler, coupled to the workforce management database, which creates future agent work schedules for the future date and sores the agent work schedules;
a simulator, coupled to the workforce management database, which models the automatic contact distribution system including simulating how long a future customer contact will be served by an agent, which contacts are routed to which agents, and duration of agent-contact interaction using the forecasts and the schedules produced by the scheduler to simulate future performance by the automatic contact distribution system on the future date and stores results of the future performance simulation;
a required staff controller, coupled to the simulator, which controls the simulator to estimate service quality to be experienced by future contacts by controlling the simulator to determine upper and lower bounds for future agent staffing required to meet service quality goals at the future date; and
a workstation including a computer, a monitor, and input/output devices, coupled to the forecaster, the scheduler, the simulator, and the required staff controller, for pen fitting a workforce planner to interact with the system to obtain forecasts of amounts and types of future contacts expected to arrive on future dates, and to create and maintain work schedules for the future date.

2. The electronic contact management system of claim 1 wherein multiple runs of the simulator for the same date are performed to generate service quality statistics including sample standard deviations.

3. The electronic contact management system of claim 1 wherein the required staff controller configures the simulator to enforce preselected maximum and minimum staff limits.

4. The electronic contact management system of claim 1 wherein the simulator comprises a user interface that permits a workforce planner to configure the simulator to simulate the contact management system during a selected number of consecutive periods.

5. The electronic contact management system of claim 1 wherein the required staff controller detects infeasible service quality goals.

6. The electronic contact management system of claim 1 wherein the required staff controller further comprises a user interface that permits a workforce planner to configure parameters that control determination of the upper and lower bounds and to initiate a required staff calculation.

7. The electronic contact management system of claim 6 wherein the interface allows selection of the measure of service quality for each contact type and selection of absolute maximum and minimum limits on numbers of agents for each agent group.

8. The electronic contact management system of claim 1 wherein the required staff controller uses a configured confidence level to determine whether a staffing level meets the service quality goals.

9. The electronic contact management system of claim 1 wherein the required staff controller determines initial upper and lower bounds and then iteratively reduces the difference between the initial upper and lower bounds by finding a greater lower bound that meets confidence levels that the greater lower bound will miss the service quality goals and finding a lesser upper bound that meets confidence levels that the lesser upper bound will meet the service quality goals.

10. The electronic contact management system of claim 1 wherein the required staff controller initiates a selected number of simulations by the simulator, the selected number selected by a workforce planner, and retrieves the service quality results from the simulator and compares the results with preselected service quality goals using a confidence test.

11. A method of electronic contact management for managing electronic multimedia contacts and a plurality of multi-skilled agents comprising the steps of:
  allocating in an automatic contact distribution system at least some of the plurality of electronic multimedia contacts to a suitable agent of the plurality of agents on an appropriate communications medium;
  storing records of customer and agent interactions in an historical database coupled to the automatic contact distribution system;
  an adapter regularly updating a workforce management database with records from the historical database of agent interactions and customer contact management, the adapter coupled to the historical database through a communications network and coupled to the workforce management database;
  a forecaster forecasting types and amounts of future customer contacts predicted to arrive at the contact management system on a future date using historical data from the workforce management database and forecasting how long an agent will take to service the future customer contact, and storing the forecasts in the workforce management database;
  a scheduler creating future agent work schedules for the future date and storing the future agent work schedules, the scheduler coupled to the workforce management database;
  a simulator modelling the automatic contact distribution system to simulate how long a customer contact will wait to be served by an agent, which contacts are routed to which agents, and duration of agent-contact interactions using the forecasts and the schedules produced by the forecaster and the scheduler, and to simulate future performance by the automatic contact distribution system on a future date, and storing the future performance data, the simulator coupled to the workforce management database;
  a required staff simulator controller controlling the simulator to estimate service quality to be experienced by future contacts by controlling the simulator to determine upper and lower bounds for future agent staffing required to meet service quality goals at a future time, the controller coupled to the simulator; and
  permitting a workforce planner to interact with the system to obtain forecasts of amounts and types of future contacts expected to arrive on the future date, and to create and maintain work schedules for the future date using a workstation including a computer, a monitor, and input/output devices coupled to the forecaster, the scheduler, the simulator, and the simulation controller.

12. The method of electronic contact management of claim 11 wherein multiple runs of the simulator for the future date are performed to generate service quality statistics including sample standard deviations.

13. The method of electronic contact management of claim 11 wherein the required staff controller configures the simulator to enforce preselected maximum and minimum staff limits.

14. The method of electronic contact management of claim 11 wherein the simulator comprises a user interface that permits a workforce planner to configure the simulator to simulate the contact management system during a selected number of consecutive periods.

15. The method of electronic contact management of claim 11 wherein the required staff controller detects infeasible service quality goals.

16. The method of electronic contact management of claim 11 wherein the required staff controller further comprises a user interface that permits a workforce planner to configure parameters that control determination of the upper and lower bounds and to initiate a required staff calculation.

17. The method of electronic contact management of claim 16 wherein the user interface allows selection of the measure of quality of service for each contact type and selection of absolute maximum and minimum limits on numbers of agents for each agent group.

18. The method of electronic contact management of claim 11 wherein the required staff controller uses a configured confidence level to determine whether a staffing level meets the service quality goals.

19. The method of electronic contact management of claim 11 wherein the required staff controller determines initial upper and lower bounds and then iteratively reduces difference between the initial upper and lower bounds by finding a greater lower bound that meets confidence levels that the greater lower bound will miss the service quality goals and finding a lesser upper bound that meets confidence levels that the lesser upper bound meet the service quality goals.

20. The method of electronic contact management of claim 11 wherein the required staff controller initiates a selected number of simulations by the simulator, and retrieves the service quality results from the simulator and compares the results with preselected goals using a confidence test.

* * * * *